(12) United States Patent
Huang

(10) Patent No.: US 12,514,681 B2
(45) Date of Patent: Jan. 6, 2026

(54) METHOD FOR FABRICATING ORTHODONTIC APPLIANCE USING BONE EXPANSION FOR DENTAL ALIGNMENT

(71) Applicant: Chi-Ching Huang, Taoyuan (TW)

(72) Inventor: Chi-Ching Huang, Taoyuan (TW)

( * ) Notice: Subject to any disclaimer, the term of this patent is extended or adjusted under 35 U.S.C. 154(b) by 365 days.

(21) Appl. No.: 18/223,025

(22) Filed: Jul. 18, 2023

(65) Prior Publication Data

US 2023/0363856 A1    Nov. 16, 2023

Related U.S. Application Data

(63) Continuation-in-part of application No. 17/083,383, filed on Oct. 29, 2020, now abandoned.

(30) Foreign Application Priority Data

Apr. 15, 2020 (CN) .......................... 202020542871.7
Jul. 6, 2020 (CN) .......................... 202010641369.6

(51) Int. Cl.
*A61C 7/00* (2006.01)
*A61C 7/10* (2006.01)
*G16H 30/40* (2018.01)

(52) U.S. Cl.
CPC ................ *A61C 7/002* (2013.01); *A61C 7/10* (2013.01); *G16H 30/40* (2018.01)

(58) Field of Classification Search
CPC ........... A61C 7/10; A61C 7/282; A61C 7/002; G16H 30/40
USPC ...................................................... 433/24
See application file for complete search history.

(56) References Cited

U.S. PATENT DOCUMENTS

| | | | |
|---|---|---|---|
| 11,839,568 B2* | 12/2023 | Huang | ................ A61F 5/566 |
| 12,056,836 B2* | 8/2024 | Reynard | .............. G06T 7/0012 |
| 2002/0018978 A1* | 2/2002 | Triaca | ...................... A61C 7/10 433/7 |
| 2013/0252195 A1* | 9/2013 | Popat | ..................... A61C 7/10 433/7 |

(Continued)

*Primary Examiner* — Matthew M Nelson
(74) *Attorney, Agent, or Firm* — Bruce Stone LLP; Joseph A. Bruce

(57) ABSTRACT

A method for fabricating orthodontic appliance using bone expansion for dental alignment is provided. The method for fabricating orthodontic appliance comprises the following steps: Step G1: obtaining a digital representation of an initial dental arch of a dental patient; Step G2: displaying the digital representation of the initial dental arch and each tooth using a dental software; Step G3: setting an expansion vector V1 for the first molar of the digital representation of the initial dental arch; Step G4: setting expansion vectors V2 for the remaining teeth of the digital representation of the initial dental arch, based on the expansion vector V1; Step G5: forming a digital representation of a target output dental arch comprising multiple teeth at the ends of the expansion vectors V1 and V2; Step G6: optionally adjusting the teeth positions of the digital representation of the target output dental arch; and Step G7: outputting a physical orthodontic appliance based on profile of the digital representation of the target output dental arch. The method may utilize dental software to implement bone expansion of dental arch and fulfill multi-stage orthodontic treatment, so has flexibility and convenience to clinical practice.

8 Claims, 28 Drawing Sheets

(56) References Cited

U.S. PATENT DOCUMENTS

| | | | |
|---|---|---|---|
| 2014/0329194 A1* | 11/2014 | Sachdeva | A61C 7/002 433/24 |
| 2018/0153649 A1* | 6/2018 | Wu | A61C 7/002 |
| 2018/0353263 A1* | 12/2018 | Salah | G06T 7/0012 |
| 2019/0223984 A1* | 7/2019 | Dou | A61C 7/002 |
| 2020/0155277 A1* | 5/2020 | Clark | A61C 7/10 |
| 2020/0306011 A1* | 10/2020 | Chekhonin | G16H 30/40 |
| 2021/0093421 A1* | 4/2021 | Michaeli | A61C 7/08 |
| 2021/0315669 A1* | 10/2021 | Huang | A61C 7/002 |
| 2022/0257344 A1* | 8/2022 | Tsai | A61C 7/002 |
| 2022/0313393 A1* | 10/2022 | Lim | A61C 7/002 |
| 2022/0378553 A1* | 12/2022 | VanNoy | A61C 7/14 |
| 2023/0145042 A1* | 5/2023 | Nikolskiy | G16H 50/50 705/2 |
| 2023/0363856 A1* | 11/2023 | Huang | A61C 7/002 |
| 2024/0261063 A1* | 8/2024 | McGann | A61B 34/10 |
| 2025/0032219 A1* | 1/2025 | Sato | A61C 7/002 |

* cited by examiner

Fig. 15 Oral scanning

METHOD FOR FABRICATING ORTHODONTIC APPLIANCE USING BONE EXPANSION FOR DENTAL ALIGNMENT

CROSS-REFERENCE TO RELATED APPLICATION

The present application is CIP filing of U.S. Ser. No. 17/083,383 and based upon and claims priority to Chinese Patent Applications No. 202010641369.6 filed on Jul. 6, 2020 and No. 202020542871.7 filed on Apr. 14, 2020, the content of which is hereby incorporated by reference in its entirety.

TECHNICAL FIELD

The present invention relates to a method for fabricating orthodontic appliance, particularly to a method for fabricating orthodontic appliance using bone expansion for dental alignment, in which the orthodontic appliance is designed for multi-stage clinic treatments of malocclusion, abnormal alignment of the teeth and jaws, overdevelopment of dental arch, induction of teeth germination, anchorage of first molar growth anchorage, leading to improve teeth alignment, occlusal relationship, and regeneration of alveolar bone morphology, etc. Additionally, the dental appliance has the capability of treating mouth breathing and improving sleep quality.

BACKGROUND

According to the World Health Organization (WHO) statistics, seven out of ten people in the world suffer from various dental problems such as teeth dislocation, malocclusion, crowding of teeth (hyperdontia), chipped tooth, crooked teeth, underbite or overbite, etc. These dental problems not only bring aesthetic implications, but also cause chewing difficulties, tooth decay, anterior teeth break, or even temporomandibular disorder, periodontal disease, dyslexia, abnormal jawbone development, etc. The causes of these issues can include both congenital or hereditary factors such as maxillary protrusion, mandibular retrusion, congenital missing teeth, or polydentosis as well as patient's personal nurture habits. Regardless of the causes, these problems such as teeth dislocation or malocclusion can be treated and improved through clinic orthodontics, resulting in increased dental health, function, and aesthetics.

Please refer to FIG. 1, FIG. 1 is schematic diagram of traditional orthodontic brace used in patient's mouth. As shown in FIG. 1, a metal dental brace 8 is positioned on the side of the lip 96 of the patient's mouth to correct misaligned teeth 95. In some clinic cases, the dental brace 8 may be positioned on the lingual side, but this can result in problems such as difficulty in cleaning, poor adaptability, and higher financial costs, as compared to positioning the dental brace 8 on the labial side (neighboring the lip 96) as shown in FIG. 1. This is why positioning the dental brace 8 on the labial side is a better option for most patients. Traditionally, the metal dental brace 8 has an archwire 81 (usually made of steel) to attach several orthodontic brackets 82, and each orthodontic brackets 82 is securely attached to the malposition tooth 95. This allows the malposition teeth 95 to be moved, rotated, and corrected through the mechanical force of the archwire 81. In this way, the malposition teeth 95 can be gradually repositioned relative to human's dental arches or jaws, achieving the desired reshaping and orthodontic outcome.

However, there is always a possibility of mechanical error or tolerance occurred on the archwire 81 and the orthodontic brackets 82 when the dental brace 8 is installed. As a result, the malposition teeth 95 may be over-corrected if the mechanical force of the archwire 81 is excessive, or have poor correction and require a longer correction time if the mechanical force of archwire 81 is insufficient. Additionally, the dental brace 8 depicted in FIG. 1 can make brush teeth difficult, especially for children. Some studies have shown that using a dental brace 8 increases the risk of cavities and periodontal diseases, which can limit its use and reduce its feasibility for children.

Due to the aforementioned issues described in orthodontics, it is desirable to address the disadvantages of the archwire 81 and provide the patients with a convenient way to brush and clean their teeth. The solution should be suitable for patients of all ages, including adults and children, and provide improved feasibility and practicality. It will be apparent to those skilled in the art how to improve the clinical experience and make the entire process more accessible.

SUMMARY

The primary objective of the present invention is to address the disadvantages of the metal archwire of dental brace used in orthodontics, and to overcome the limitation for correcting azimuth and movement, so as to improve accuracy in tooth correction and increase control.

The other objective of the present invention is to provide a multi-stage orthodontic appliance for treating the malocclusion, malposition or abnormal alignment of the teeth and jaws, reshaping and regenerating jawbone through biological morphology of orthodontics, and addressing hypoplasia or overdevelopment of the dental arch. Furthermore, the orthodontic appliance takes into consideration factors such as ease of tooth brushing and cleaning for added convenience.

The further other objective of the present invention is to make orthodontic treatment, dental arch adjustment, occlusion adjustment, teeth reshape, and malocclusion treatment adaptable to all ages including adults and kids, as well as teeth germination induction can also be achieved. Thus, the dislocated, malalignment teeth or malocclusive jaws are able to be adjusted and moved to proper position so as to meet Centric Relation (CR) and Class I occlusion of Angle's Classification, therefore the stability of occlusion and teeth positions are as a result improved.

The still other objective of the present invention is to alleviate respiratory tract obstruction, decrease severe snoring and mouth breathing resulting from lower resting position of the tongue. This will allow for breath training, and minimize the negative effects of snoring and sleep apnea, and ultimately enhance the quality of sleep.

For dealing with those aforementioned issues addressed, the present invention suggests a method for fabricating orthodontic appliance using bone expansion for dental alignment, to fulfill multi-stage orthodontic treatment. The method for fabricating orthodontic appliance comprises the following steps: Step G1: obtaining a digital representation of an initial dental arch of a dental patient; Step G2: displaying the digital representation of the initial dental arch and each tooth using a dental software; Step G3: setting an expansion vector V1 for the first molar of the digital representation of the initial dental arch; Step G4: setting expansion vectors V2 for the remaining teeth of the digital representation of the initial dental arch, based on the expansion vector V1; Step G5: forming a digital representation of a target output dental arch comprising multiple teeth at the ends of the expansion vectors V1 and V2; Step G6: optionally adjusting the teeth positions of the digital representation of the target output dental arch; and Step G7: outputting a physical orthodontic appliance based on profile of the digital representation of the target output dental arch.

According to an embodiment of the aforesaid method for fabricating orthodontic appliance using bone expansion for dental alignment, wherein the Step G3 has the following sub-steps: Step G31: moving or rotating the teeth of the digital representation of the initial dental arch to align the fossae or cusps of all teeth in a curved digital intermediate dental arch; Step G32: superimposing the two first molars of the digital intermediate dental arch onto the buccal side of the two first molars of the digital representation of the initial dental arch; Step G33: setting an expansion vector V1 from the first molar of the digital representation of the initial dental arch towards the first molar of the digital intermediate dental arch. It may be further characterized that the superimposing position of four first molars are evenly distributed on left quadrant and right quadrant.

According to an embodiment of the aforesaid method for fabricating orthodontic appliance using bone expansion for dental alignment, wherein the Step G3 has the following sub-steps: Step G31: moving or rotating the teeth of the digital representation of the initial dental arch to align the fossae or cusps of all teeth in a curved digital intermediate dental arch; Step G32: superimposing the two first molars of the digital intermediate dental arch onto the buccal side of the two first molars of the digital representation of the initial dental arch; Step G33: setting an expansion vector V1 from the first molar of the digital representation of the initial dental arch towards the first molar of the digital intermediate dental arch. It may be further characterized that the alignment of four first molars in Step G32 are achieved by aligning the mesial buccal cusps of the four first molars in a straight line.

According to an embodiment of the aforesaid method for fabricating orthodontic appliance using bone expansion for dental alignment, wherein the Step G3 has the following sub-steps: Step G31: moving or rotating the teeth of the digital representation of the initial dental arch to align the fossae or cusps of all teeth in a curved digital intermediate dental arch; Step G32: superimposing the two first molars of the digital intermediate dental arch onto the buccal side of the two first molars of the digital representation of the initial dental arch; Step G33: setting an expansion vector V1 from the first molar of the digital representation of the initial dental arch towards the first molar of the digital intermediate dental arch. It may be further characterized that the rotation of the tooth in Step G31 is less than 30 degree.

According to an embodiment of the aforesaid method for fabricating orthodontic appliance using bone expansion for dental alignment, wherein the Step G4 has the following sub-steps: G41: Setting the expansion distance d2 for the remaining teeth of the digital representation of the initial dental arch based on the expansion distance d1 of the expansion vector V1; and G42: Setting an individual expansion vector V2 for each tooth starting from the remaining teeth of the digital representation of the initial dental arch, with the expansion vector V1 as the direction and the expansion distance d2 as the value for the remaining teeth. It may be further characterized that the value of the expansion distance d2 is determined by mathematical formula $d2=d1*0.8^n$, where n=0 for the second molar, n=1 for the second premolar, n=2 for the first premolar, n=3 for the canine, n=∞ for the incisor.

According to an embodiment of the aforesaid method for fabricating orthodontic appliance using bone expansion for dental alignment, wherein the Step G4 has the following sub-steps: G41: Setting the expansion distance d2 for the remaining teeth of the digital representation of the initial dental arch based on the expansion distance d1 of the expansion vector V1; and G42: Setting an individual expansion vector V2 for each tooth starting from the remaining teeth of the digital representation of the initial dental arch, with the expansion vector V1 as the direction and the expansion distance d2 as the value for the remaining teeth. It may be further characterized that the expansion distance d1 or the expansion distance d2 are between 1 to 3 mm.

In summary, the present invention of method for fabricating orthodontic appliance can prevent the disadvantages of the metal archwire of dental brace used in orthodontics, and to provide a higher accuracy in tooth correction and greater control by overcoming limitation in azimuth and movement. Secondly, the present invention seeks to reshape and regenerate jawbone through biological morphology of orthodontics, as well as address the dental arch hypoplasia or overdevelopment. Thirdly, the orthodontic appliance also prioritizes ease and convenience for of all ages, including adults and children, in terms of tooth brushing and cleaning, and simultaneously correct the malocclusion, malposition or abnormal alignment of the teeth and jaws. Fourthly the orthodontic appliance can achieve teeth germination induction and proper positioning of dislocated, malaligned teeth or malocclusive jaws, so as to meet Centric Relation (CR) and Class I occlusion of Angle's Classification, and therefore resulting in a stable occlusion and teeth positions. Thus the present invention has great potential in both clinic practice and commercialization.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

The accompanying drawings, which are incorporated in and constitute a part of this specification, illustrate embodiments consistent with the invention and, together with the description, serve to explain the principles of the present disclosure.

DETAILED DESCRIPTION

Figure 1:
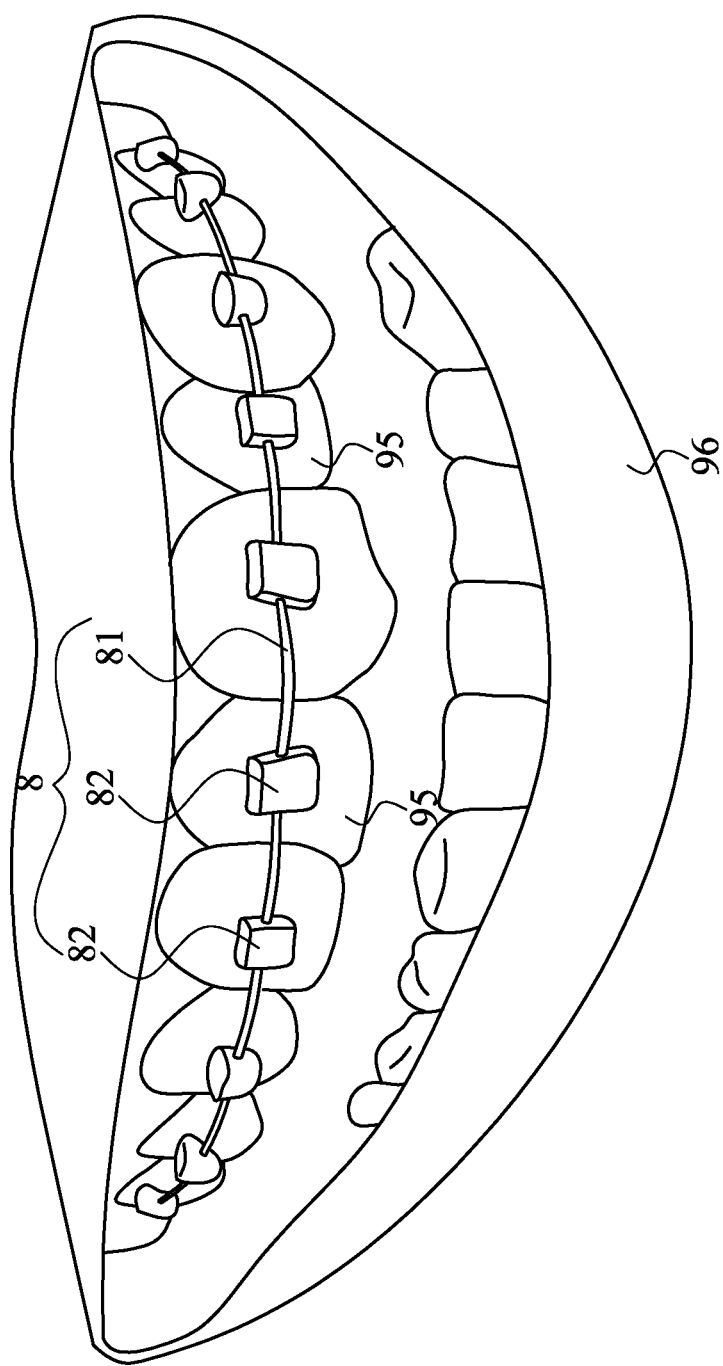
FIG. 1 is schematic diagram of traditional orthodontic brace used in patient's mouth.
Figure 2:
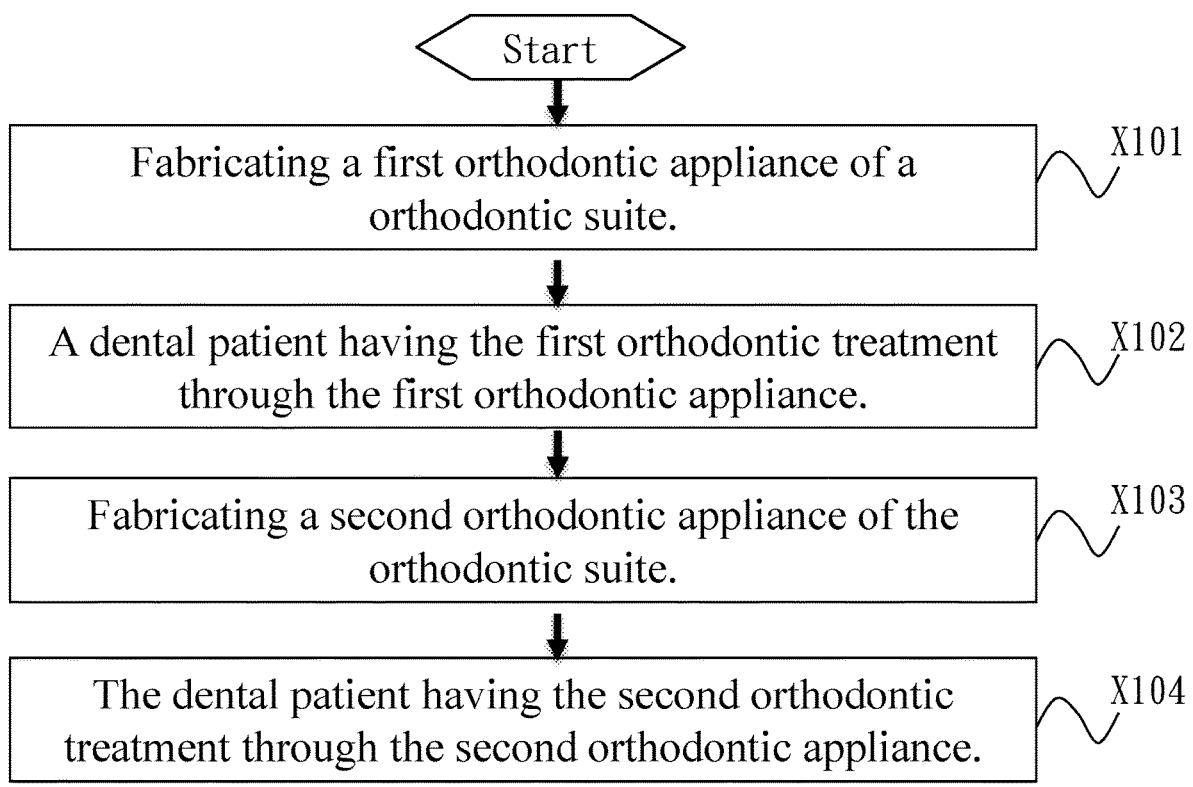
FIG. 2 is flow chart showing multi-stage manufacturing method of orthodontic suite.

Dental treatment of orthodontics is specialized practice for oral cavity aimed at correcting teeth, reshaping teeth, or treating malocclusions, so as to achieve perfect teeth alignment and beautiful dental arch profile. In order to achieve that, the present invention suggests an orthodontic suite and a manufacturing method to produce the orthodontic suite. Please refer to FIG. 2, FIG. 2 is flow chart showing multi-stage manufacturing method of orthodontic suite. As shown in FIG. 2, a manufacturing method of orthodontic suite 10 is provided, which firstly fabricates a first orthodontic appliance 10 of an orthodontic suite (Step X101), so that a dental patient may have the first orthodontic treatment through the first orthodontic appliance 10 (Step X102). According to the clinic outcome after the first treatment, then it shall fabricate a second orthodontic appliance 20 of the orthodontic suite (Step X103), so that the dental patient may have the second orthodontic treatment through the second orthodontic appliance 20 (Step X104).

Figure 3:
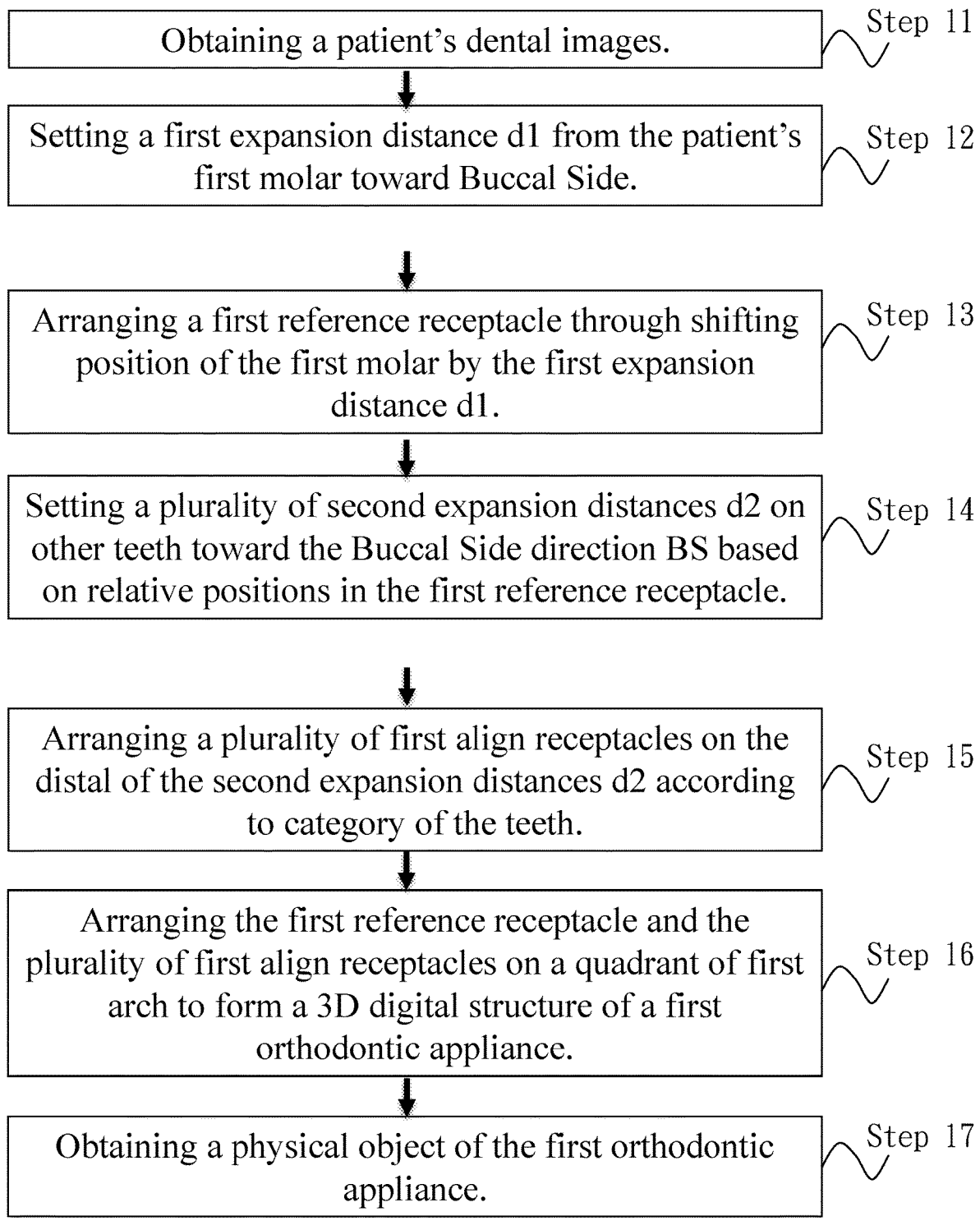
FIG. 3 is flow chart showing the manufacturing method of first orthodontic appliance.
Figure 4:
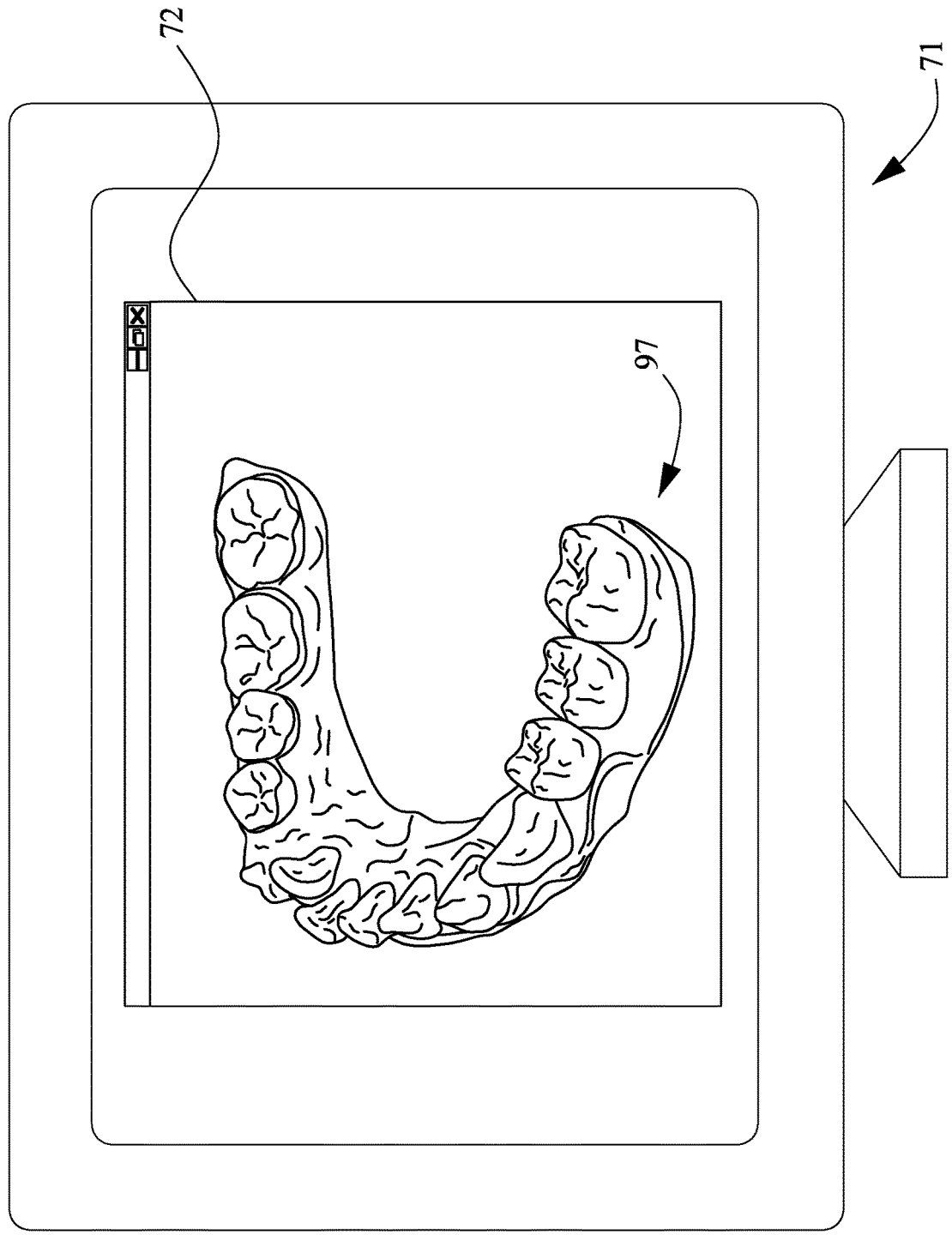
FIG. 4 is schematic diagram of patient's image of dental arch.
Figure 5A:
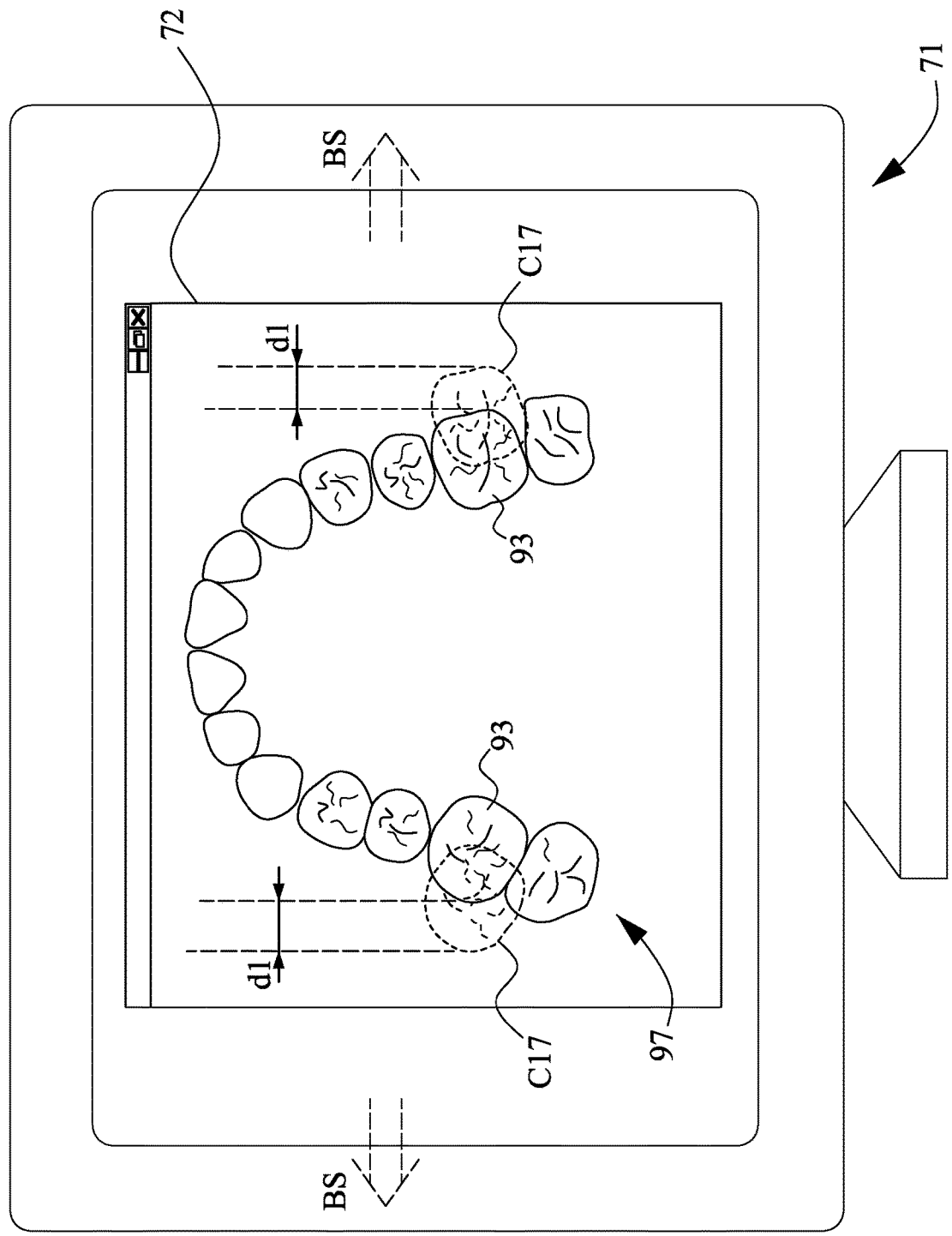
FIG. 5A~5C are schematic diagrams showing manufacture procedure of the first orthodontic appliance.

Please refer to FIG. 3, FIG. 3 is flow chart showing the manufacturing method of first orthodontic appliance. Specifically, the Step X101 can have further sub-steps, and be broken down into Steps 11~17 as demonstrated in FIG. 3. As shown in FIG. 3, a patient's dental images can be obtained (Step 11) through Computed Tomography (CT), X-Ray, nuclear magnetic resonance or ultrasonic instruments, or oral scan or dental arch molding technique. These dental images include but not limits in DICOM-format (Digital Imaging and Communications in Medicine) photos or other digital pictures. As show in FIG. 4, the aforementioned dental images can be obtained and recorded through a computer 71 (including and not limiting on smartphone, server or other hardware devices) or a dental software 72, so that 3D profile, structural relationship and visualization features of a dentition 97 or dental arch are thus achieved. In this way, the location, orientation, azimuth or surface profile of each tooth prior to orthodontic treatment is obtained. Then, a Buccal Side direction BS is defined for the dentition 97 and the dental arch, going from interior toward cheek of the patient. As shown in FIG. 5A, a first expansion distance d1 is set from the patient's first molar 93 toward patient's cheek along Buccal Side direction BS (Step 12 in FIG. 3), and arrange a first reference receptacle C17 through shifting position of the first molar 93 by the first expansion distance d1 (Step 13). In this way, the location of the first reference receptacle C17 is exactly the site which the dental patient's first molar 93 is planned to move to, so that the first reference receptacle C17 meets Class I occlusion relationship of Angle's Classification. The Angle's Classification categorizes malocclusion based on the relative position of the maxillary first molar 93 in the dentition 97. The Angle's Classification categorizes occlusion into 3 classes: Class I, Neutrocclusion, which means normal occlusion with the upper jaw incisor covering and being 1 to 3 mm anterior the lower jaw incisor. Class II: Distocclusion, which means the upper jaw incisor is too much anterior to the lower jaw incisor, namely excess overjet or overbite, or compensatory retraction of maxillary incisor leading to skeletal buck teeth. And Class III, Mesiocclusion, meaning the lower jaw incisor is anterior to the upper jaw incisor, so as to become negative overjet or anterior crossbite, or have symptoms of maxillary retraction or mandible protrusion (so-called underbite).

Figure 5B:
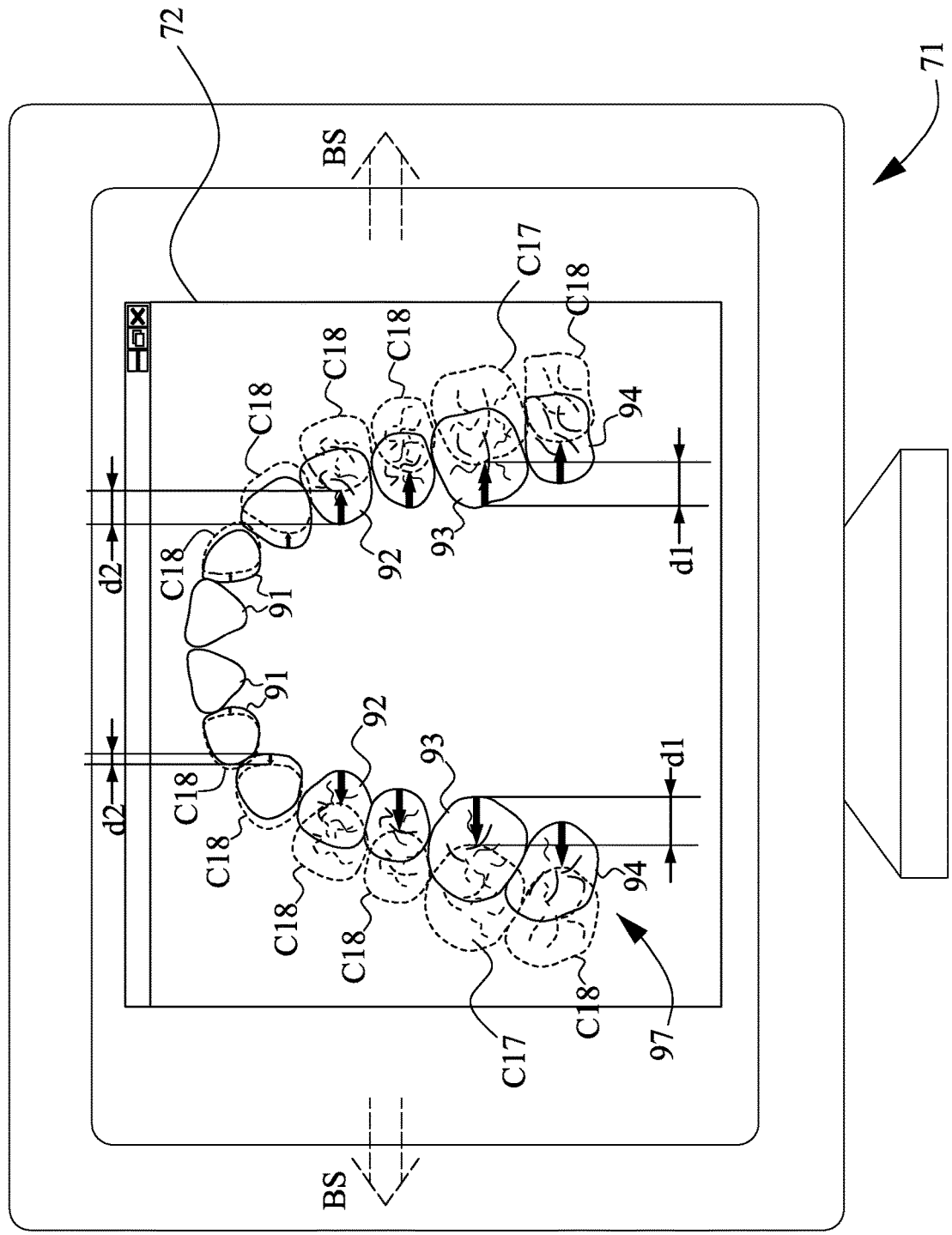

Afterward, as shown in FIG. 5B, a plurality of second expansion distances d2 are set on other teeth toward the Buccal Side direction BS, based on relative positions with the first reference receptacle C17 (Step 14 in FIG. 3); wherein the "other teeth" means all teeth includes incisors 91, canines 92 and other molars 94, excluding the first molar 93. In practice, each second expansion distance d2 of all teeth will be unequal, therefore dentist or dental technician needs to decide the value of the second expansion distance d2 according to age of the patient or future growth of patient's dental arch; since kid is expected to have huge expanding potentials on his/her dental arch. Clinically the second expansion distance d2 is smaller than or equal to 1.2 times the first expansion distance d1, and larger than or equal to 0.2 times the first expansion distance d1; namely $0.2*d1 \le d2 \le 1.2*d1$. Specifically, the second expansion distance d2 of patient's incisor 91 is smaller than or equal to 0.4 times the first expansion distance d1, and larger than or equal to 0.2 times the first expansion distance d1; namely $0.2*d1 \le d2 \le 0.4*d1$. Further, the second expansion distance d2 of patient's canine 92 is smaller than or equal to 0.8 times the first expansion distance d1, and larger than or equal to 0.4 times the first expansion distance d1; namely $0.4*d1 \le d2 = 0.8*d1$. Moreover, the second expansion distances d2 of patient's other molars 94 are smaller than or equal to 1.2 times the first expansion distance d1, and larger than or equal to 0.8 times the first expansion distance d1; namely $0.8*d1 \le d2 \le 1.2*d1$. Therefore the dentist or dental technician can arrange a plurality of first align receptacles C18 on the distal of the second expansion distances d2 according to category of the teeth (Step 15 in FIG. 3), and then the first align receptacles C18 are able to correspond to all teeth other than the first molars 93.

Figure 5C:
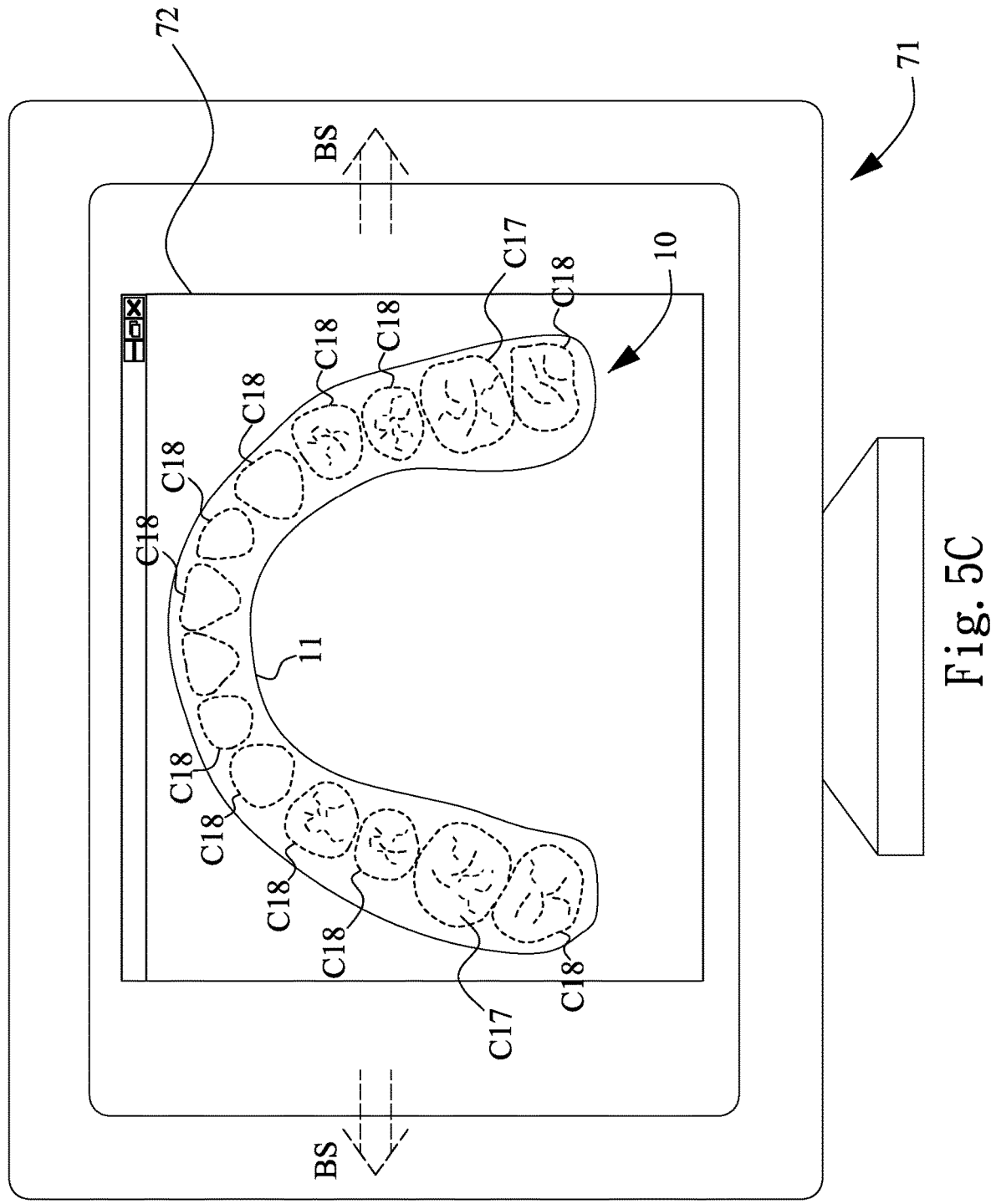

As shown in FIG. 5C, the first reference receptacle C17 and the plurality of first align receptacles C18 are arranged on a quadrant of first arch 11, so as to form a 3D digital structure of a first orthodontic appliance 10 (Step 16 in FIG. 3), wherein the first arch 11 comprises right-side quadrant and left-side quadrant. Afterward, a physical object of the first orthodontic appliance 10 (Step 17 in FIG. 3) is hence obtained. In the preferred embodiment, the physical object of the first orthodontic appliance 10 is made through 3D Printing, and demonstrated in FIG. 6A and FIG. 6B.

Figure 6A:
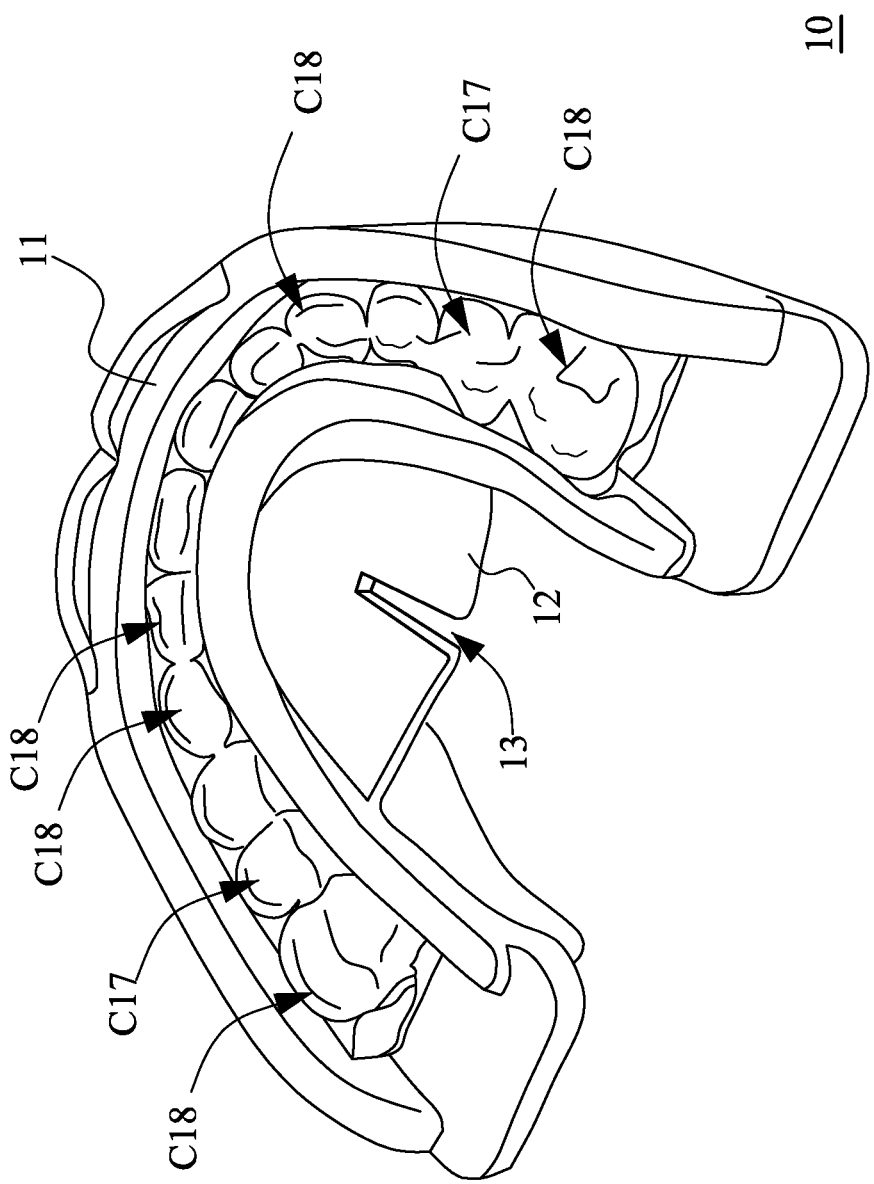
FIG. 6A~6B are schematic diagrams showing perspective view and top view of the first orthodontic appliance.
Figure 6B:
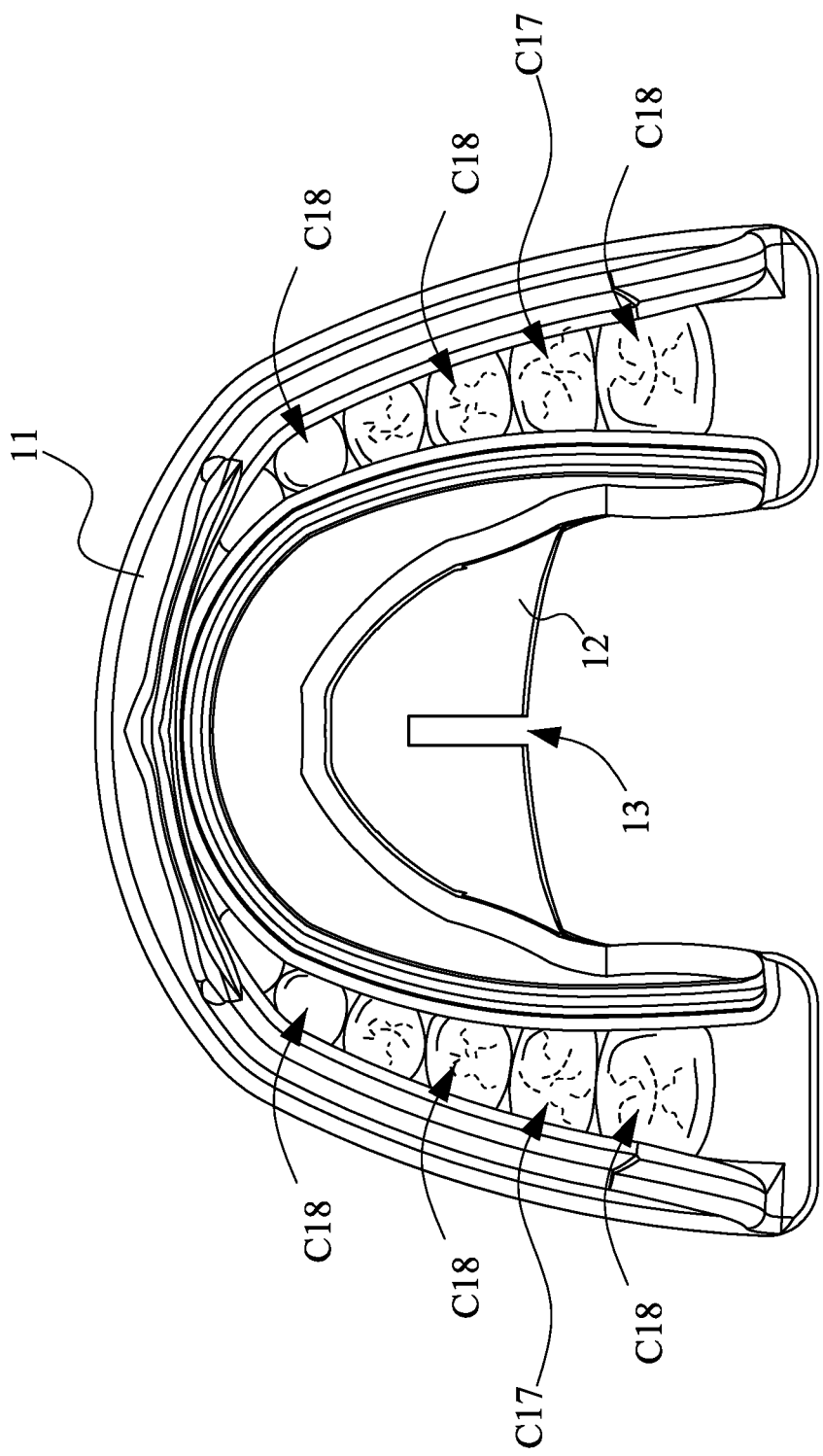
Figure 7A:
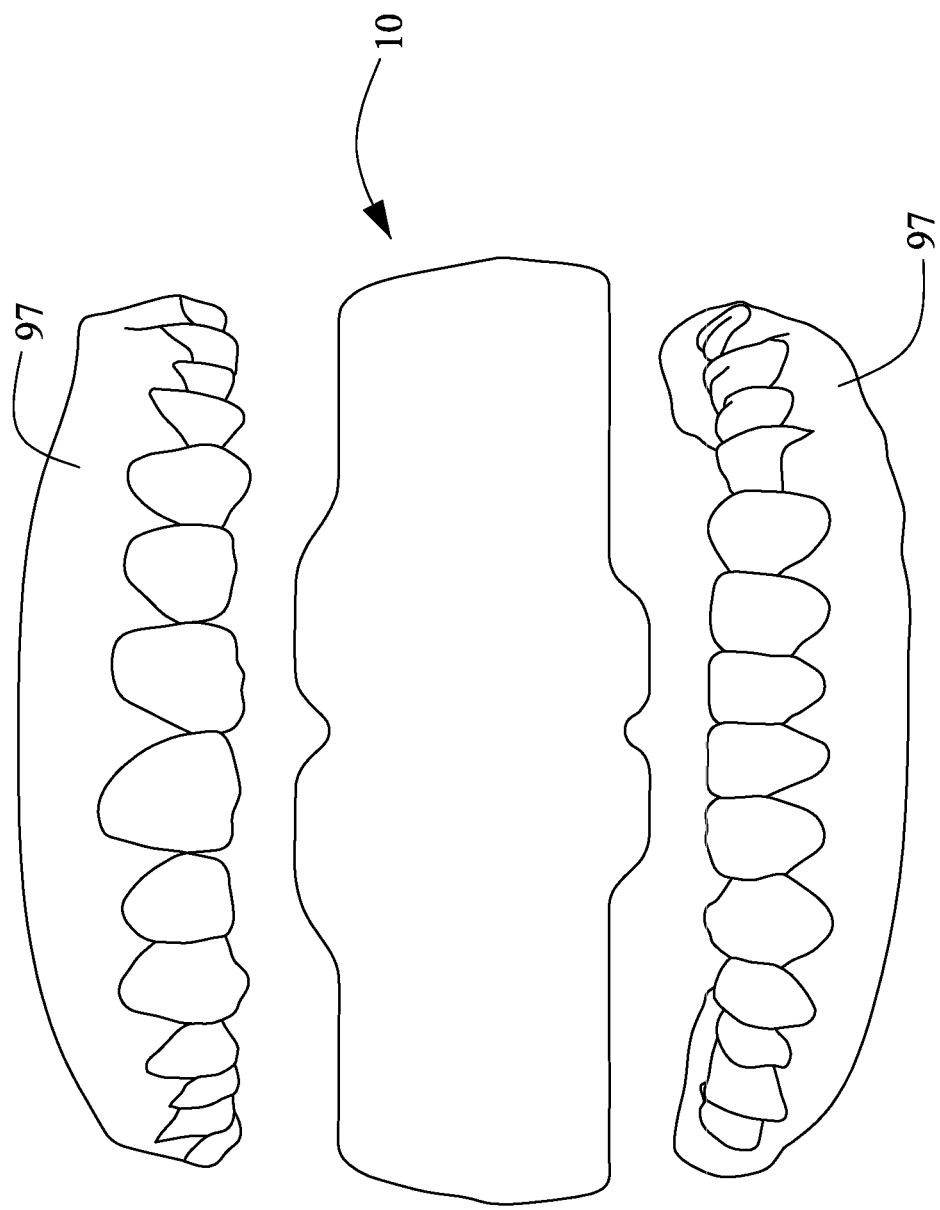
FIG. 7A~7C are schematic diagrams showing dental arch and the first orthodontic appliance before and after the patient's occlusion.
Figure 7B:
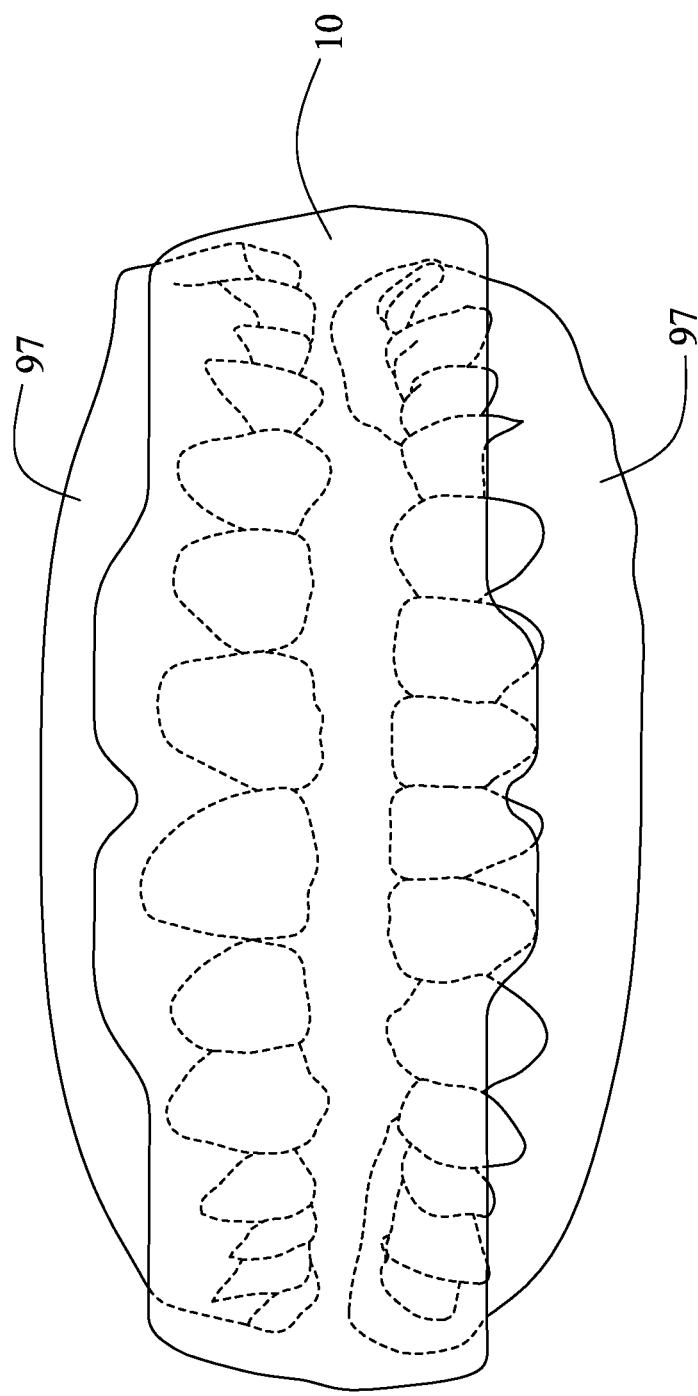
Figure 7C:
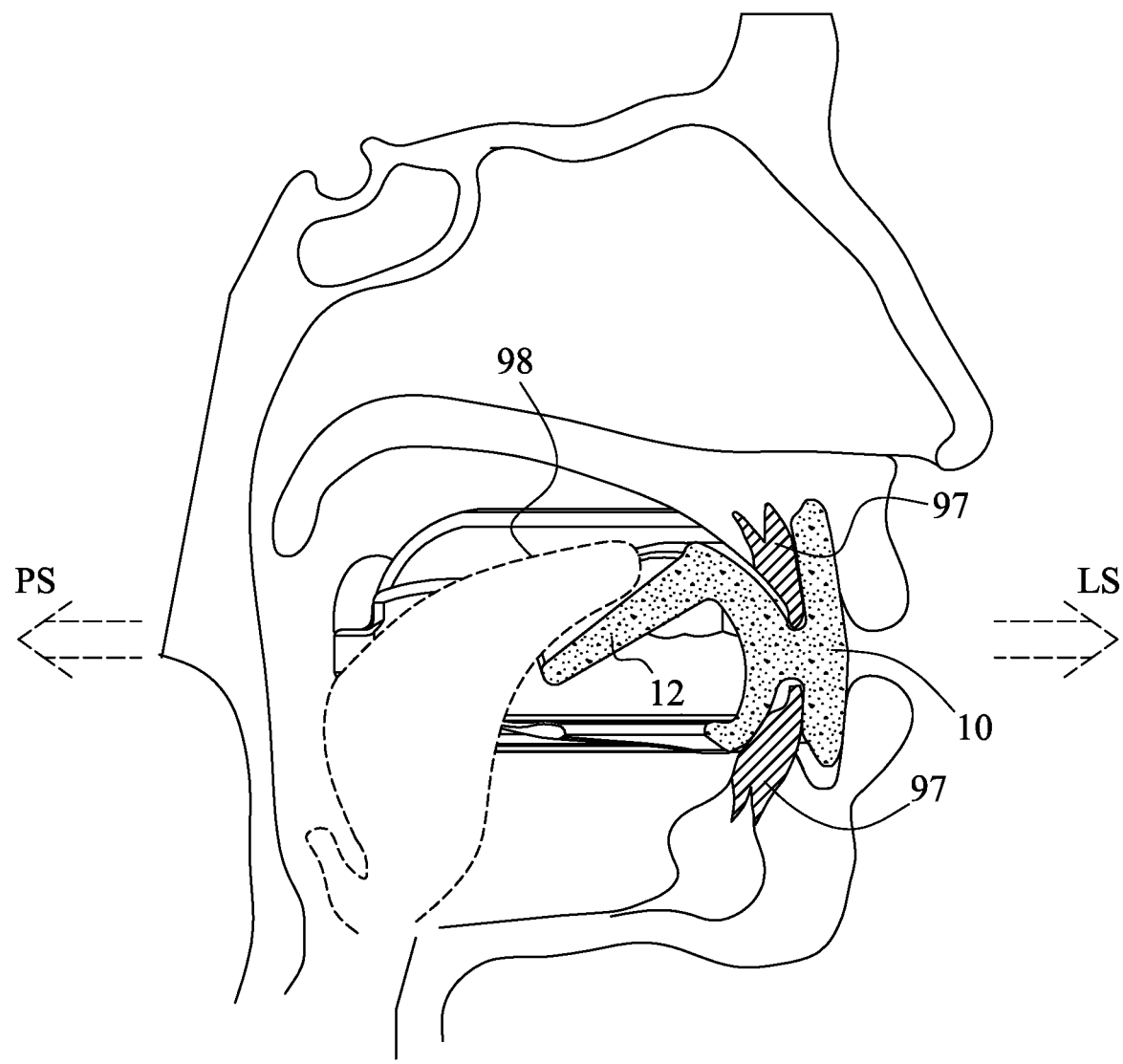

Please refer to FIG. 6A and FIG. 6B, FIG. 6A~6B are schematic diagrams showing perspective view and top view of the first orthodontic appliance. As shown in FIG. 6A~6B, physical object of the first orthodontic appliance 10 has main body, i.e. first arch 11, and a plurality of first reference receptacles C17 and first align receptacles C18 disposed on the main body of the first orthodontic appliance 10. When orthodontic treatment is made, the first orthodontic appliance 10 can be bitten in patient's mouth as shown in FIG. 7A, and then aligned with the dentition 97 of upper jaw or lower jaw. Afterward, as shown in FIG. 7B and FIG. 7C, dental patient closes the mouth to have the upper jaw and lower jaw of dentition 97 approached to each other, and to bite the first orthodontic appliance 10.

Figure 8:
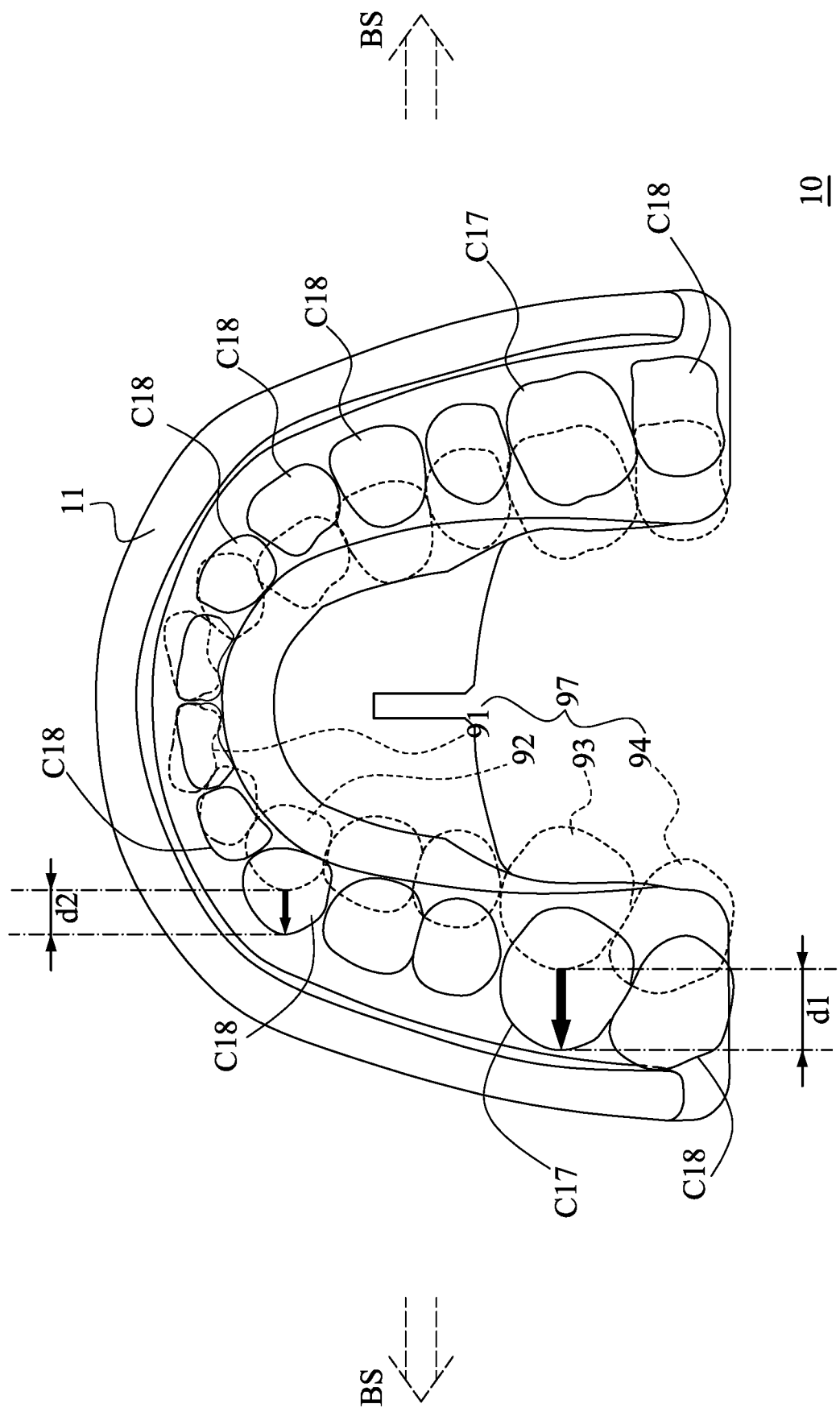
FIG. 8 is schematic diagram showing structural relationship between patient's teeth and troughs of the first orthodontic appliance.

Further refer to FIG. 5A-5C and FIG. 8, in which FIG. 8 is schematic diagram showing structural relationship between patient's teeth and troughs of the first orthodontic appliance. When the first orthodontic appliance 10 is used in patient's mouth, the first reference receptacles C17 are expected to match up with the first molars 93; therefore, the first reference receptacles C17 needs to be disposed at distal of the first expansion distance d1 along Buccal Side direction BS. Then, the plurality of first align receptacles C18 are expected to match up with other teeth (including incisors 91, canines 92, other molars 94 but excluding first molars 93); therefore, the first align receptacles C18 need to be disposed at distal of the related second expansion distances d2 along Buccal Side direction BS. In this way, setting and adjustment of the first expansion distance d1 are able to decide the spatial relationship (such as relative position, orientation or azimuth) between the first molar 93 and the first arch 11 when the Step 12 in FIG. 3 is made. Furthermore, the setting and adjustment of the second expansion distance d2 can determine the spatial relationship between the other teeth (including incisors 91, canines 92, other molars 94 but excluding first molars 93) and the first arch 11 during the Step 14 in FIG. 3. Hence, the greater expansion distance d1 and d2 are set, more push force will be generated to move the tooth. Thus, dentist or dental technician can designate future expecting movement or rotation of each tooth, and then arrange these movement and rotation on the first orthodontic appliance 10, so that the first orthodontic appliance 10 can have the structural/spatial information of teeth's movement and rotation. Clinically the present invention of the first orthodontic appliance 10 can have orthodontic function through pushing one tooth to move, or shifting several teeth to expand dental arch. Therefore, dental patient can make his/her teeth move, rotate and thus meet the pre-defined dentition of the first orthodontic appliance 10, to implement first orthodontic treatment.

Besides as shown in FIG. 6A, the first orthodontic appliance 10 further has a first tongue support 12 disposed at inner side of the first arch 11. The first tongue support 12 has a slot 13 disposed on midline of the first arch 11. The slot 13 can be a crevasse or U-shaped groove, to accommodate human's ankyloglossia (also called tongue-tie). When dental patient bites the first orthodontic appliance 10, he/she can put the tongue above the first tongue support 12, to address the uncomfortable feeling of the patient and increase his/her intention for this orthodontic treatment. Additionally, as shown in FIG. 7C, the first tongue support 12 gradually slopes downward along the opposite of Labial Side direction LS, namely the altitude of the first tongue support 12 gradually decrease along the Palate Side direction PS. When the dental patient bites the first orthodontic appliance 10, he/she can put his/her tongue 98 above the first tongue support 12, so as to raise the position of the tongue 98 and relax the throat muscles, and then open the respiratory tract to avoid human's airway obstruction. Besides, it can also have advantages such as reducing or eliminating symptom of "mouth breathing" which is caused by snoring and lowered tongue position. Therefore, the first tongue support 12 disposed on the first orthodontic appliance 10 can have breath-training function for the patient who suffered sleep apnea or severe snoring, so as to reduce the snoring noise and frequency, and improve his/her sleep quality.

After the Step 11 to Step 17, as shown in FIG. 3, are implemented, it means that fabricating the first orthodontic appliance 10, as shown in Step X101 of FIG. 2, is carried out. Then and therefore the patient can have orthodontic treatment through the first orthodontic appliance 10 (Step X102 in FIG. 2). The purpose of first orthodontic treatment as presented in Step X102 is to enlarge and expand the size of patient's dentition 97, and afterward move and rotate each individual tooth in the dentition 97. Specifically, enlarging or expanding patient's dentition 97 needs to extend the dental arch toward the Buccal Side direction BS (i.e. toward left side and right side), so that the width of the dental arch in the Buccal Side directions BS is thus widened. Then, according to future size and space of patient's permanent teeth, the position and orientation of all teeth can be designated by the dentist or dental technician. The first orthodontic treatment may have functions of growing the alveolar bone among the locations which has insufficient space for tooth growth, or inhibit the growth of bone in the case of overgrowth of alveolar bone. Furthermore, it can not only increase the space for rotation and displacement of each individual tooth, but also make the facial and chin contour more beautiful. The clinical orthodontic result of the first orthodontic appliance 10 had demonstrated that the patient may have about 1 mm displacement in 2 to 6 weeks to move individual tooth of patient's dentition 97.

Figure 9:
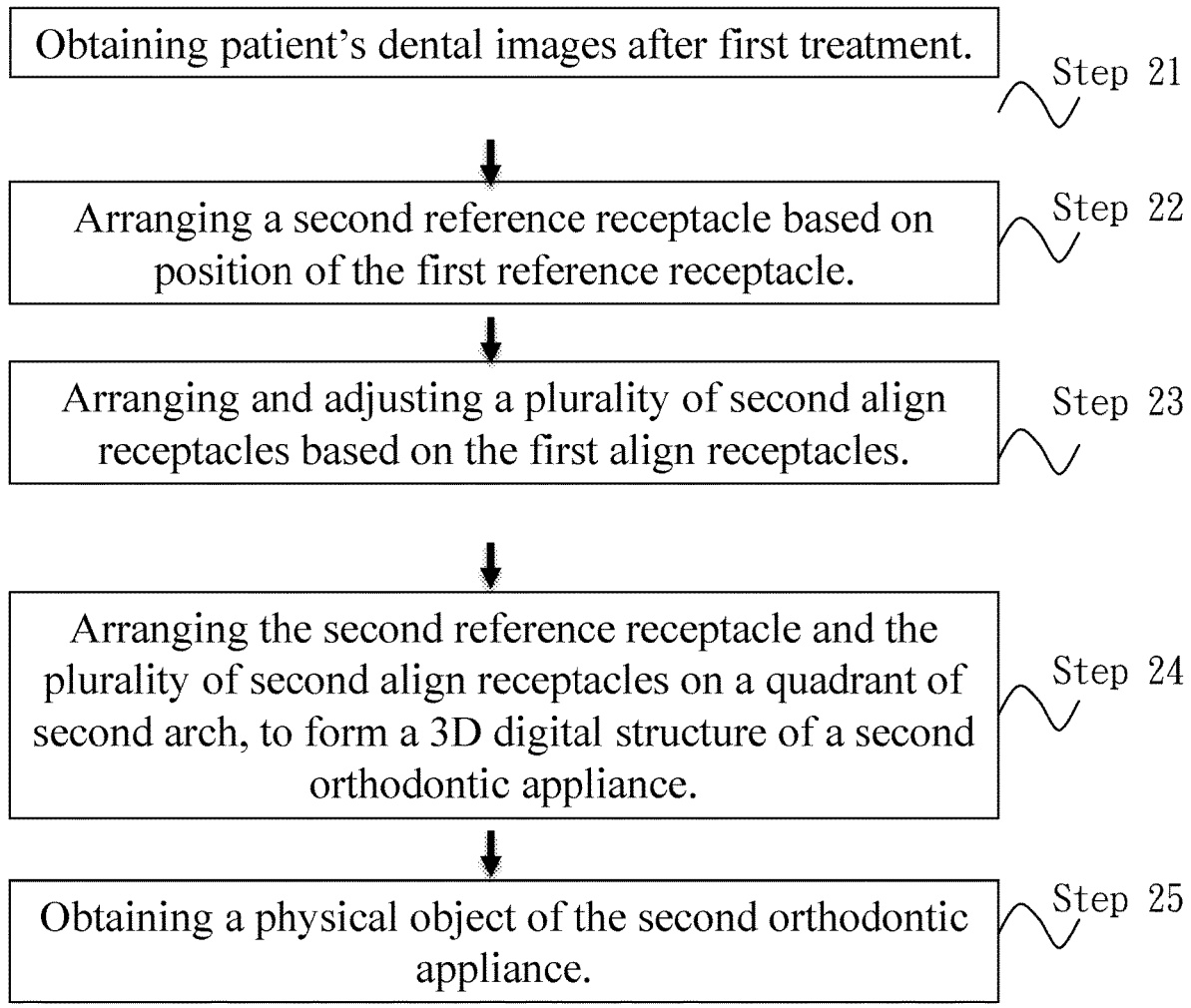
FIG. 9 is flow chart showing the manufacturing method of second orthodontic appliance.
Figure 10:
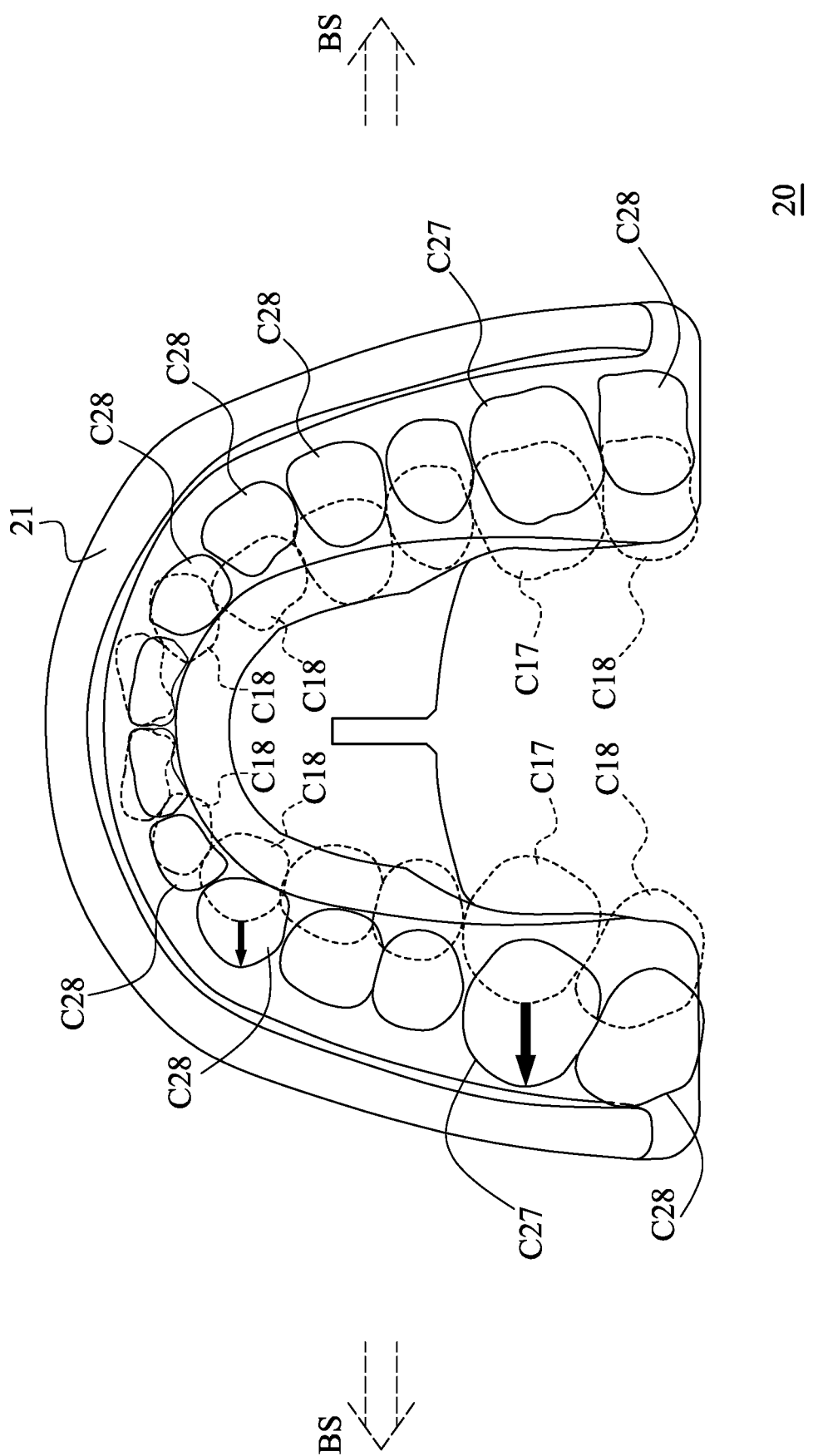
FIG. 10 is schematic diagram showing structural relationship between troughs of the first orthodontic appliance and the second orthodontic appliance.

Please refer to FIG. 9 and FIG. 10, FIG. 9 is flow chart showing the manufacturing method of second orthodontic appliance; FIG. 10 is schematic diagram showing structural relationship between troughs of the first orthodontic appliance and the second orthodontic appliance. The Step X103, as shown in FIG. 2, can be further broken down into Step 21 to Step 25 as shown in FIG. 9. Firstly, the patient's dental images after first treatment can be obtained (Step 21). The way of obtaining dental images includes Computed Tomography, X-Ray, nuclear magnetic resonance or ultrasonic instruments, or oral scan or dental arch molding technique, etc., which is identical to the manufacturing method of the first orthodontic appliance 10. Next, a second reference receptacle C27 is arranged, based on position of the first reference receptacle C17 (Step 22), then a plurality of second align receptacles C28 are arranged and adjusted, based on position of the first align receptacles C18 (Step 23). More specifically in Step 23, the second align receptacles C28 can be disposed through shifting the sites of the first align receptacles C18 by ¼ to ⅓ of tooth's section width, or rotating the sites of the first align receptacles C18 by an angle less than 30 degree. Namely the exact position of the second align receptacles C28 are set by limited displacement or rotating angle based on the first align receptacles C18. In this reason, as shown in FIG. 10, dentist or dental technician can decide the pre-designated movement or rotation of each individual tooth for second orthodontic treatment, based on the position of first reference receptacles C17 and first align receptacles C18. Afterward the second reference receptacle C27 and the plurality of second align receptacles C28 on a quadrant of second arch 21 are able to be arranged, so as to form a 3D digital structure of a second orthodontic appliance 20 (Step 24). Thus a physical object of the second orthodontic appliance 20 is obtained (Step 25), such that the second reference receptacles C27 disposed on the second orthodontic appliance 20 meet Class I occlusion relationship of Angle's Classification. By the way, the digital structure of troughs C27 and C28, physical object of the second orthodontic appliance 20, and the manufacturing method of present invention as described in Step 24 and Step 25 are similar to the first orthodontic appliance 10.

Thus, physical object of the second orthodontic appliance 20 has main body, i.e. second arch 21, and a plurality of second reference receptacles C27 and second align receptacles C28 disposed on the main body of the second orthodontic appliance 20. Besides, the location and orientation of the second reference receptacles C27 is identical to the first reference receptacles C17, and the second align receptacles C28 are set and arranged through shifting or rotating the first align receptacles C18.

In this way, the dental patient can have the second orthodontic treatment through the second orthodontic appliance 20 (Step X104 in FIG. 2). The main purposes of the second orthodontic treatment are addressed as followed; firstly, patient's first molars 93 can be met and located at the second reference receptacles C27 of the second orthodontic appliance 20, for anchoring and positioning of occlusion. Secondly, utilizing the second reference receptacles C 27 as anchorage to move or rotate each individual tooth through occlusion training, so that all teeth can be afterward moved and rotated to meet the pre-designated location (i.e. location of the second align receptacles C28), and have function of occlusal adjustment and occlusal correction for patient's dentition 97. Therefore, patient's dentition 97 may eventually meet Class I occlusion relationship of Angle's Classification, as well as move the upper and lower jaws to Centric Relation (CR) and thus improve the stability of patient's occlusion. Please noted that, the position of Centric Occlusion (CO) is the position where the upper teeth and lower teeth bite in the closest-fit condition, namely the upper teeth and lower teeth bite to meet the largest occlusal surface. Furthermore, the Centric Relation (CR) is the mandibular jaw position in which the head of the condyle is situated as far anterior and superior as it possibly can in the mandibular glenoid fossa, where CR is the most stable situation to all teeth. Normally, the most prefect situation is that the position of CO has 0.5 mm to 1 mm displacement away from the position of CR. The present invention of orthodontic suite may adjust and correct the jaws in multi stages, thus the patient who suffers malocclusion of Class II or Class III occlusion relationship of Angle's Classification can have orthodontic treatment, and then make the patient's first molars 93 be gradually moved and rotated to meet Class I occlusion relationship of Angle's Classification; in which the first reference receptacles C17 and second reference receptacles C27 are designated and set to meet Class I occlusion relationship of Angle's Classification. Therefore, upper jaw and lower jaw correction through the present invention of orthodontic suite may have the first molars 93 moved and guided to be anchored at position to meet Class I occlusion relationship, and keep the upper jaw and lower jaw in the Centric Relation for the sake of dental health. If the dental patient is in the period of deciduous teeth falling off and permanent teeth germinating, e.g. around or before adolescence, then the orthodontic suite of the present invention can also adjust the contour of the patient's face and jaw, to let him/her have a more beautiful cheek shape. If the patient suffers from muscle dysfunction, having problems such as dysphagia with tongue prick or reverse swallowing, can improve his/her insufficiency of chewing or unilateral mastication through the occlusal training of the present invention. Since the 1990, it is found that there are dental bone forming cells (i.e. osteoblast) and bone resorption cells (i.e. osteoclast) in the alveolar bone, which affect the growth or contraction of the upper and lower jaw. When dental patient use the orthodontic suite of present invention, it can stimulate patient's oral sensitive cells through occlusion of upper jaw and lower jaw, and then convert the occlusal force into biological nerve signals of human body, so as to activate the "bone forming cells" or "bone resorption cells"; therefore alveolar bone growth or resorption is thus controllable. In this way, the alveolar bone of human may react to the designated contour of first orthodontic appliance 10 and second orthodontic appliance 20, so as to activate osteoblast or osteoclast cells, and afterward grow or contract alveolar bone to shape the chin contour when dental patient has orthodontic treatment through the orthodontic suite of present invention. Thus, correction for jawbone, mandibular bone growth or chin shaping is achievable. Generally speaking, orthodontic treatment through the orthodontic suite of present invention can take advantage of tissue change biology to treat overdevelopment of dental arch or insufficient alveolar bone, and have functions of alveolar bone shaping, bone repair, bone correction and arranging teeth toward correct positions.

The second orthodontic appliance 20 may also have a second tongue support and a slot 13, so that the patient who bites the second orthodontic appliance 20 can raise altitude of his/her tongue 98, so as to relax the throat muscles and then open the respiratory tract to avoid human's airway obstruction. Additionally, it can also have advantages such as reducing or eliminating symptom of "mouth breathing" which is caused by snoring and lowered tongue position, and even have breath-training function for the patient who suffered sleep apnea or severe snoring, so as to reduce the snoring noise and frequency.

Figure 11:
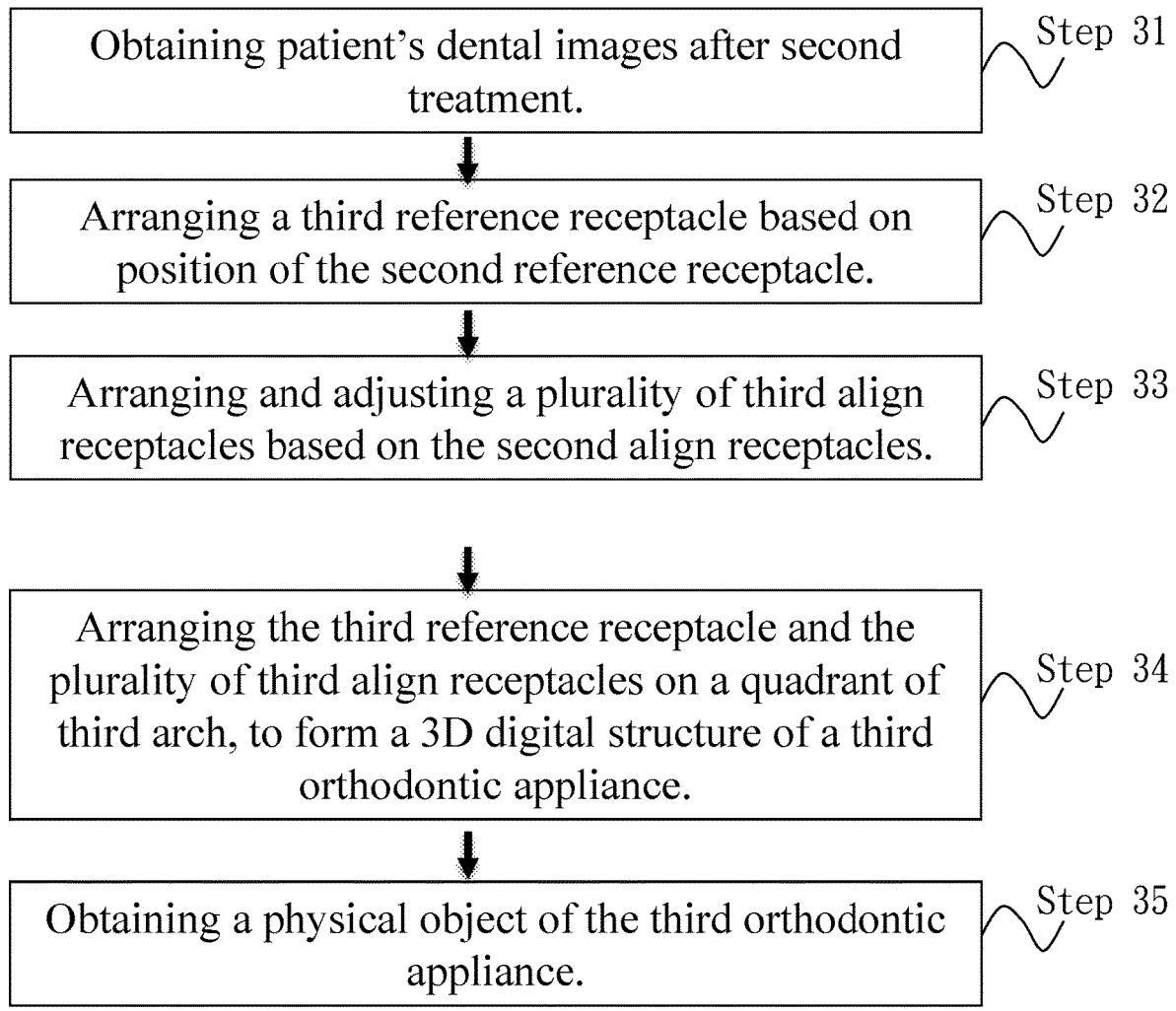
FIG. 11 is flow chart showing the manufacturing method of third orthodontic appliance.

Next, dentist can decide whether a third orthodontic treatment is needed, according to clinic condition of the patient after the first and second treatment are made. If needed, the third orthodontic appliance is therefore required to be fabricated. Please refer to FIG. 11, FIG. 11 is flow chart showing the manufacturing method of third orthodontic appliance. As shown in FIG. 11, patient's dental images after second treatment are obtained (Step 31), then a third reference receptacle based on position of the second reference receptacle C27 is arranged (Step 32). Afterward a plurality of third align receptacles based on the second align receptacles C28 are arranged and adjusted (Step 33), and eventually the third reference receptacle and the plurality of third align receptacles are arranged on a quadrant of third arch, so as to form a 3D digital structure of a third orthodontic appliance (Step 34). Then, a physical object of the third orthodontic appliance is obtained (Step 35). Therefore, the third orthodontic appliance comprises a third arch, and the third arch has plurality of third reference receptacles and third align receptacles; such that positions of the third reference receptacles are identical to positions of the second reference receptacles C27; the positions of the third align receptacles are arranged through shifting the positions of the second align receptacles C28 by ¼ to ⅓ of tooth's section width, or rotating the sites of the second align receptacles C28 by an angle less than 30 degree. Descriptively, the fabricating method of the third orthodontic appliance is similar to the second orthodontic appliance 20, thus further address is not repeated. The clinic purpose of the third orthodontic treatment is a supplement or follow-up to the second treatment, so as to have greater correction and adjustment orthodontic effect.

Figure 12:
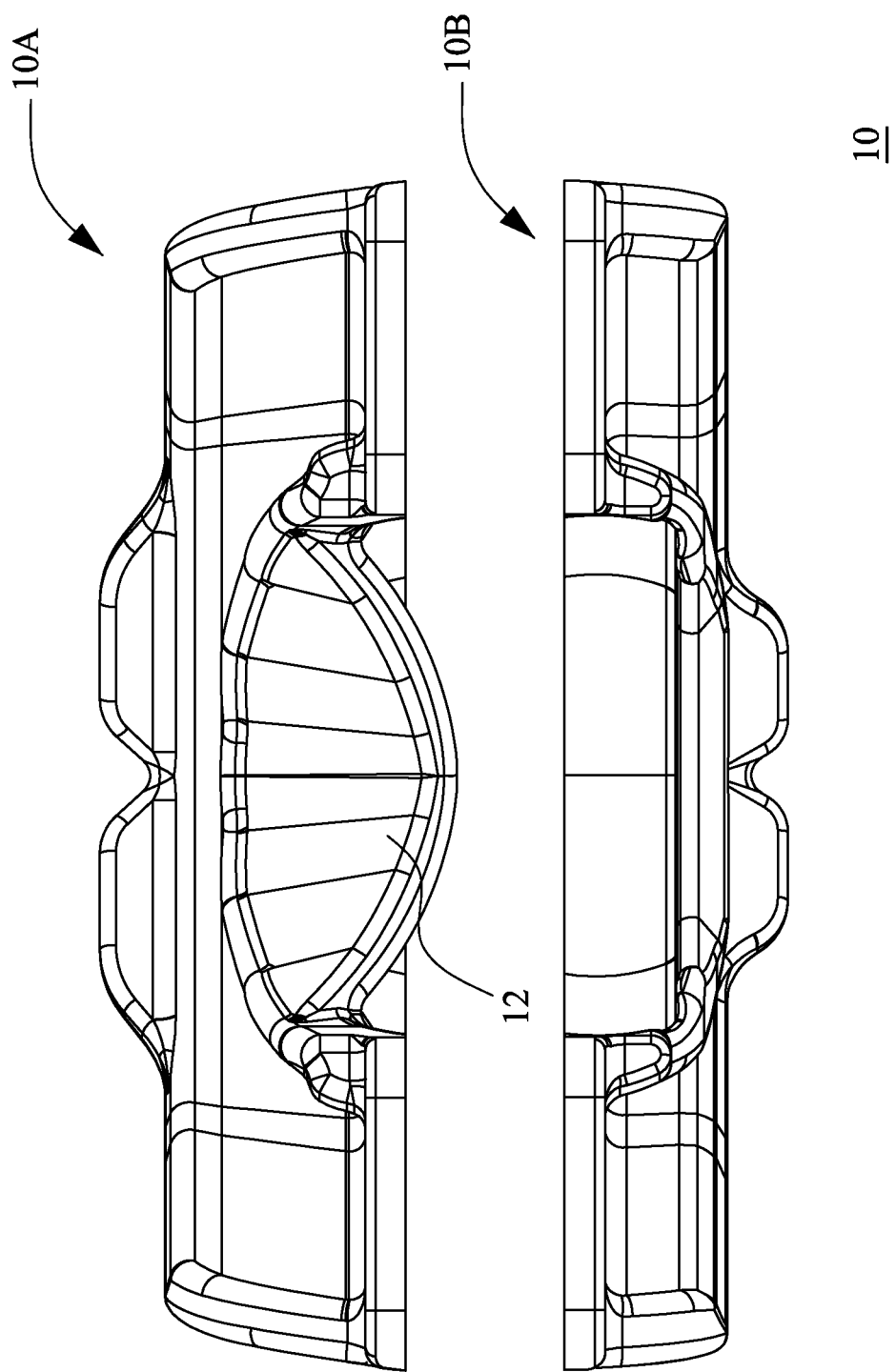
FIG. 12 is schematic diagram showing the orthodontic appliance with the upper part arch and the under part arch separately fabricated.
Figure 13A:
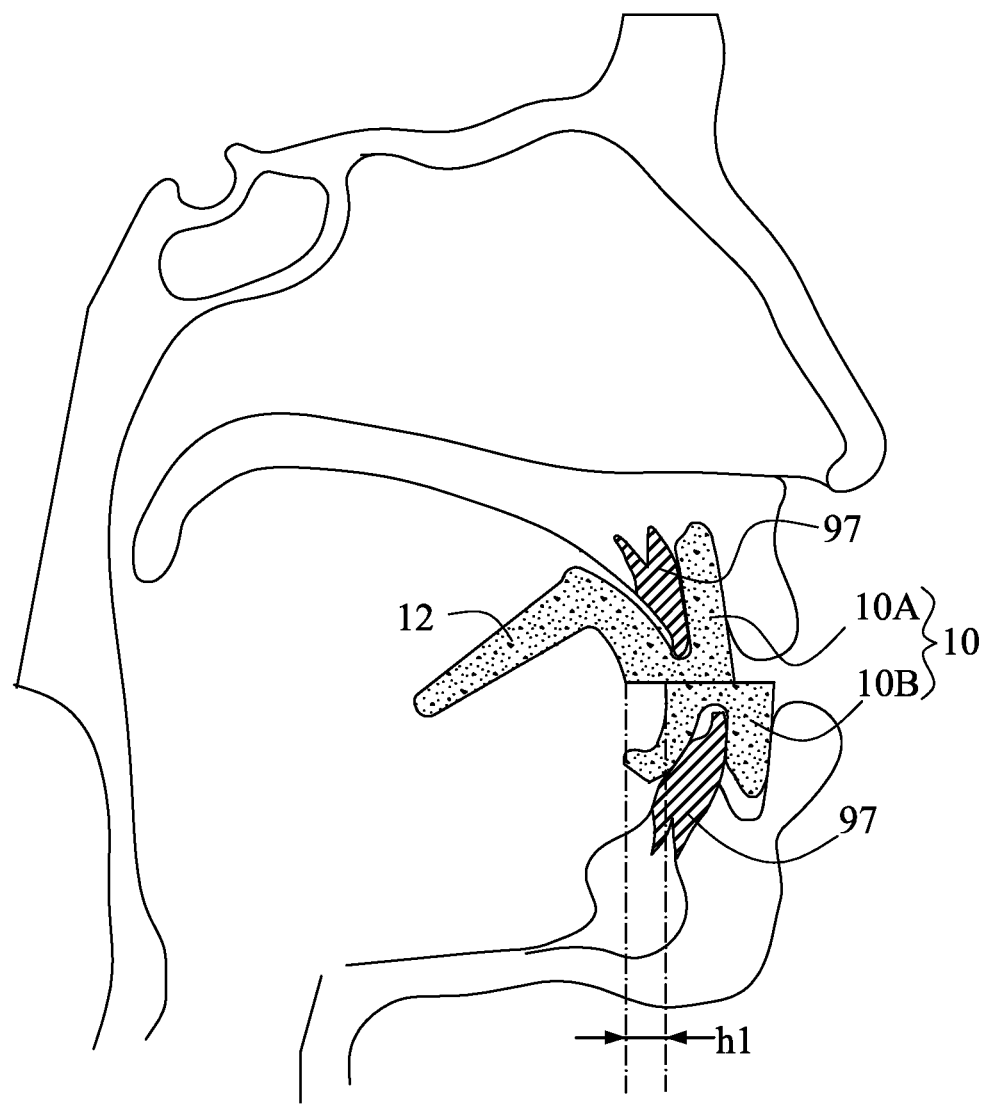
FIG. 13A~13B are schematic diagrams showing upper part arch and under part arch of the orthodontic appliance are made in different stage.
Figure 13B:
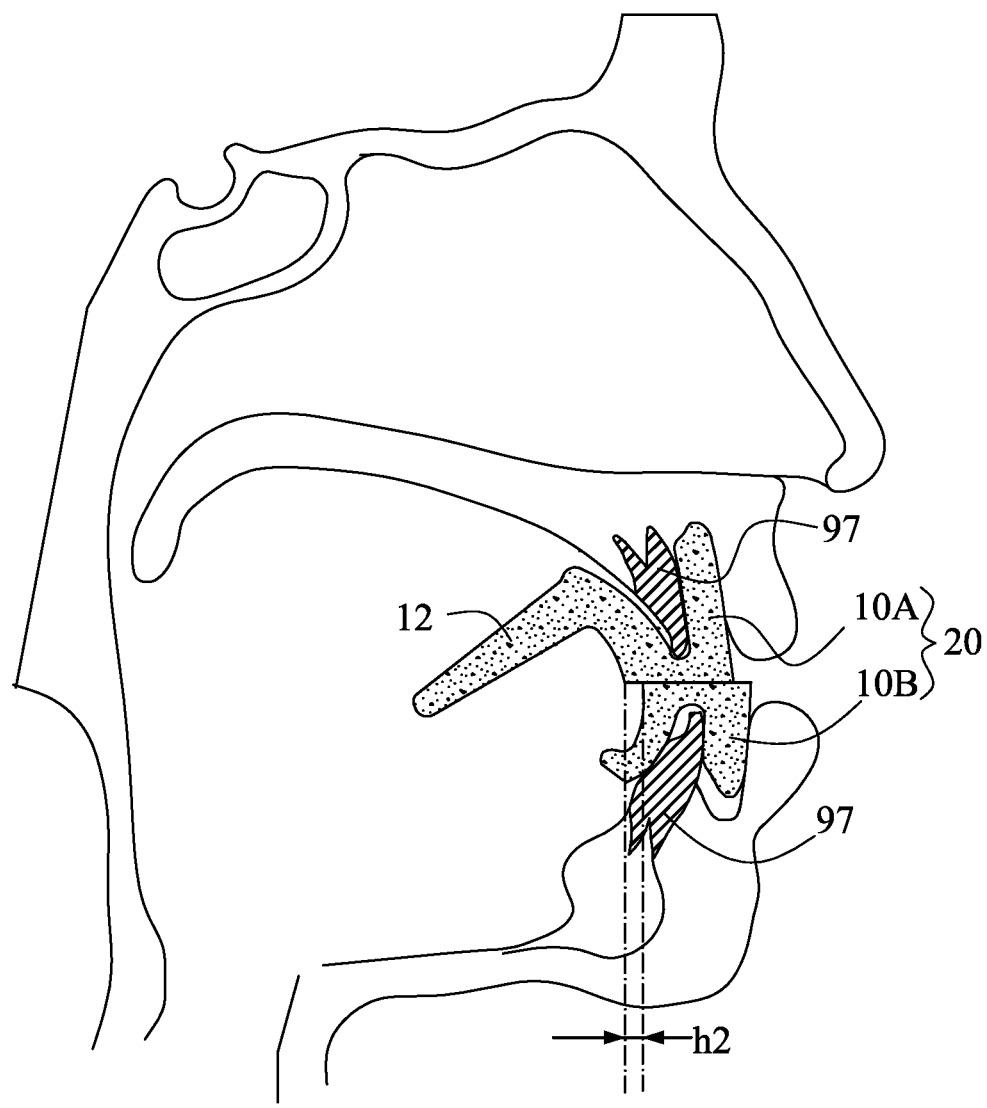

Please refer to FIG. 12, FIG. 12 is schematic diagram showing the orthodontic appliance with the upper part arch and the under part arch separately fabricated. As shown in FIG. 12, the first orthodontic appliance 10 can be separately fabricated, thus the first orthodontic appliance 10 has a upper part arch 10A and a under part arch 10B respectively. The upper part arch 10A can match dental patient's upper jaw and meet the profile of the upper jaw; the under part arch 10B can match dental patient's lower jaw and meet the profile of the lower jaw. After physical object of the first orthodontic appliance 10 is manufactured (Step 17 in FIG. 3), then the upper part arch 10A and the under part arch 10B can be adhered and combined. The combined first orthodontic appliance 10 can be used in the first orthodontic treatment as shown in FIG. 13A. When upper jaw and lower jaw of dentition 97 has greater malocclusion, the upper part arch 10A and the under part arch 10B can have a greater shift h1 to adhere together, so that the first orthodontic appliance 10 can treat patient's greater malocclusion. After the first orthodontic treatment is finished, the malocclusion between upper jaw and lower jaw is reduced; in this circumstance, it enters the second orthodontic treatment as shown in FIG. 13B, the upper part arch 10A and the under part arch 10B is adhered and combined with smaller shift h2, so as to form the second orthodontic appliance 20. Namely the first orthodontic appliance 10 has greater shift h1 between the upper part arch 10A and the under part arch 10B, and the second orthodontic appliance 20 has smaller shift h2. In this way, dental technician can design the profile of the orthodontic appliance once, and then fabricate and obtain the physical object of orthodontic appliances for multi stages (including first, second and third) through arranging different shift h1 or h2. Therefore, laboring cost on profile design of the orthodontic appliance is reduced.

Figure 14:
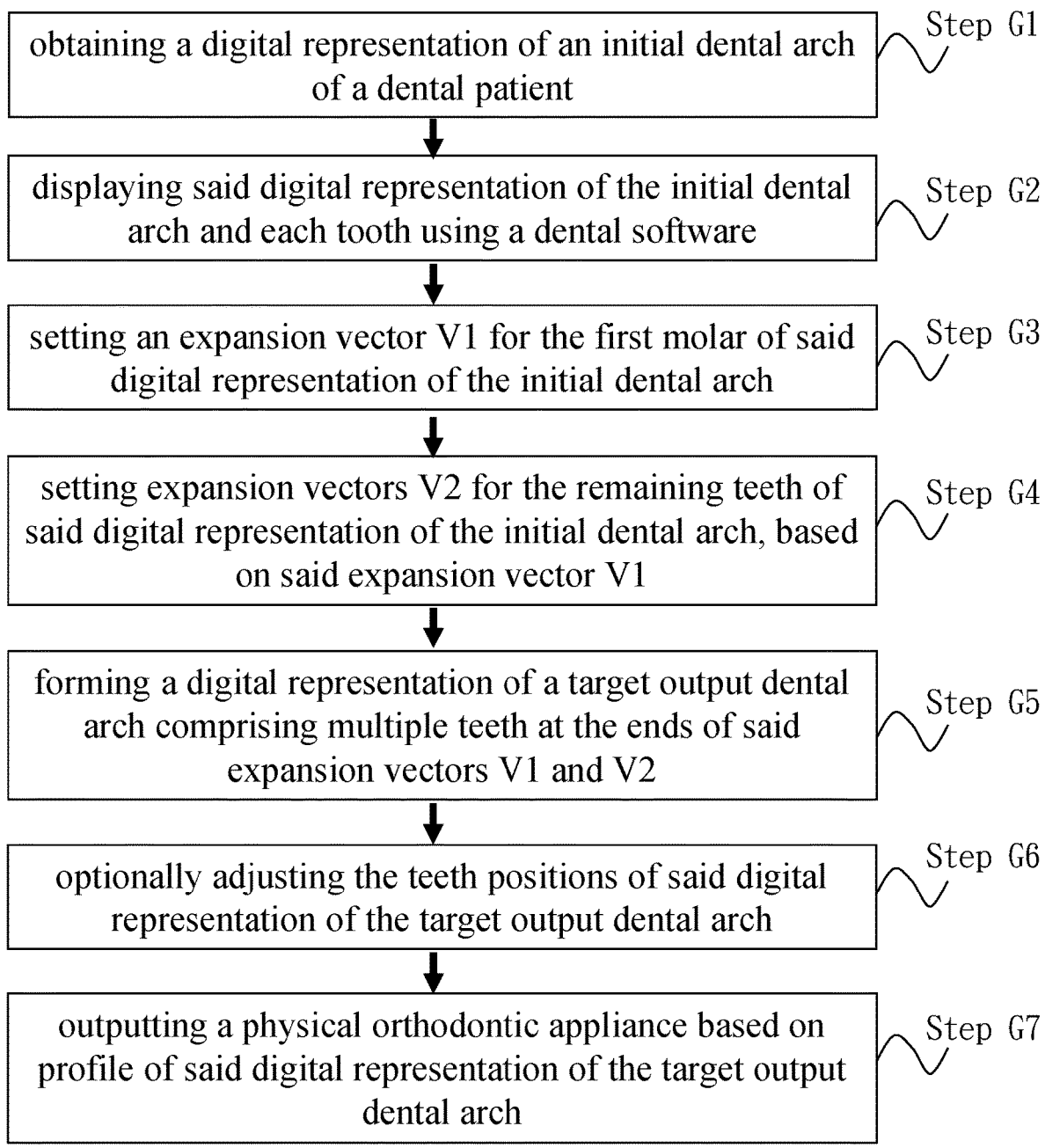
FIG. 14 is flow chart showing method for fabricating orthodontic appliance using bone expansion for dental alignment.
Figure 15:
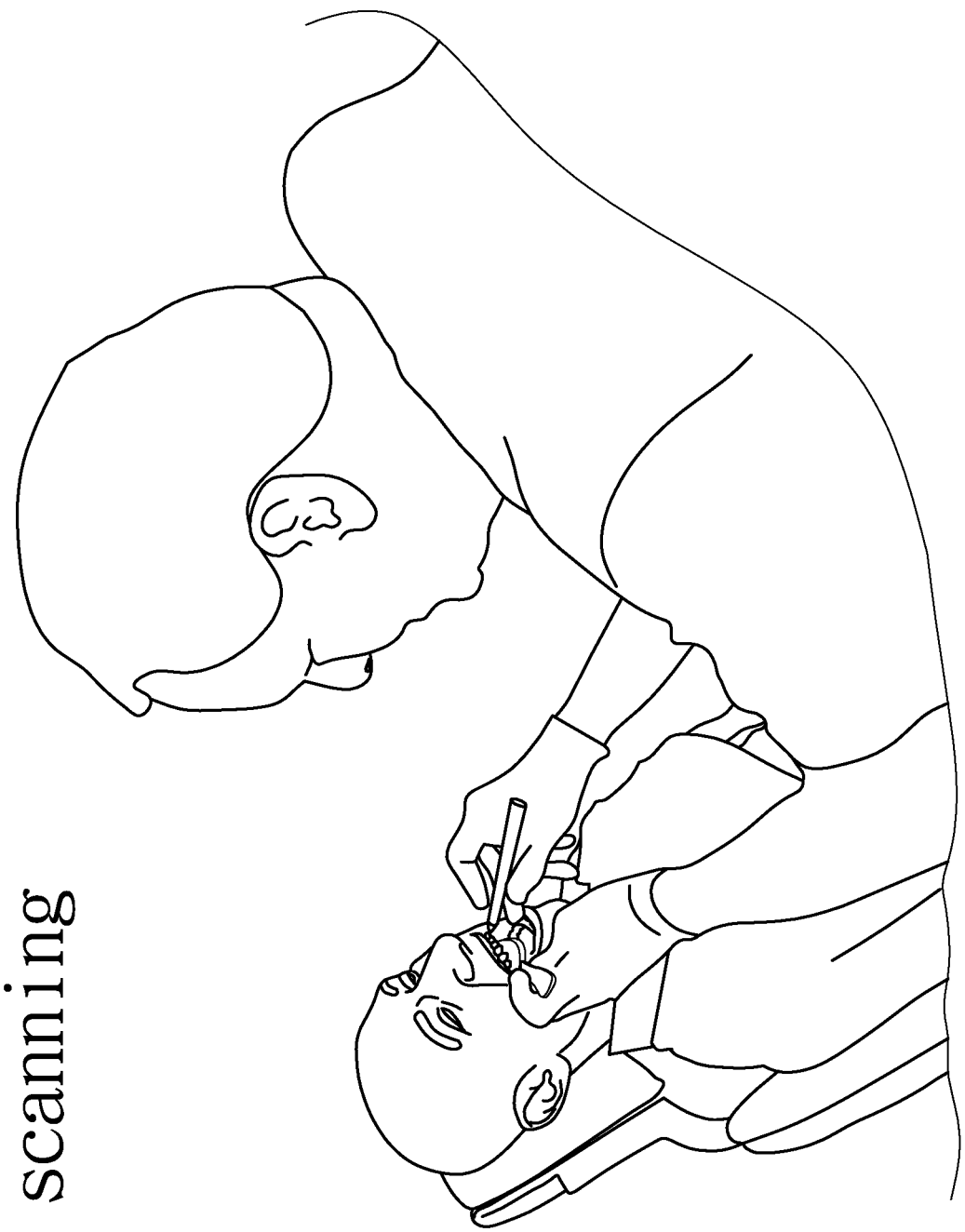
FIG. 15 is schematic diagram showing oral scanning of a dental patient to obtain the contour of dental arch.

More descriptively, the method for fabricating orthodontic appliance 10 using bone expansion for dental alignment is further disclosed. As shown in FIG. 14 and FIG. 15, a digital representation of an initial dental arch 51 of a dental patient is obtained using digital scanning or imaging techniques (step G1). The digital representation can be achieved through oral scan or oral impression and then plaster replication traditionally. In step G1, the use of digital scanning or imaging techniques eliminates the need for physical impressions, reducing patient discomfort and providing a more accurate representation of the dental arch. Besides, digital initial dental arch 51 means that the positions of all teeth and contour of the dental arch displayed on the dental software 72 are formed before orthodontic treatment or any correction is made; namely teeth dislocation or crooked can be seen within the initial dental arch 51. The digital model captures the intricate details of the teeth, enabling a comprehensive assessment of the patient's dental condition through the dental software 72, and thus the digital representation can provide a detailed and accurate representation of the patient's teeth alignment. As shown in the FIG. 4, teeth contour of patient's dentition 97 is recorded in the dental software 72, and the digital representation of the initial dental arch 51 and each tooth using a dental software 72 (step G2). The dental software 72 enables visualization and manipulation of the digital representation, revealing 3D model and allowing for precise analysis and treatment planning. This visualization allows the orthodontist to examine the current tooth alignment and identify any anomalies or malocclusions that need correction. The dental software 72 provides advanced analysis tools for precise measurement and treatment planning.

Figure 16:
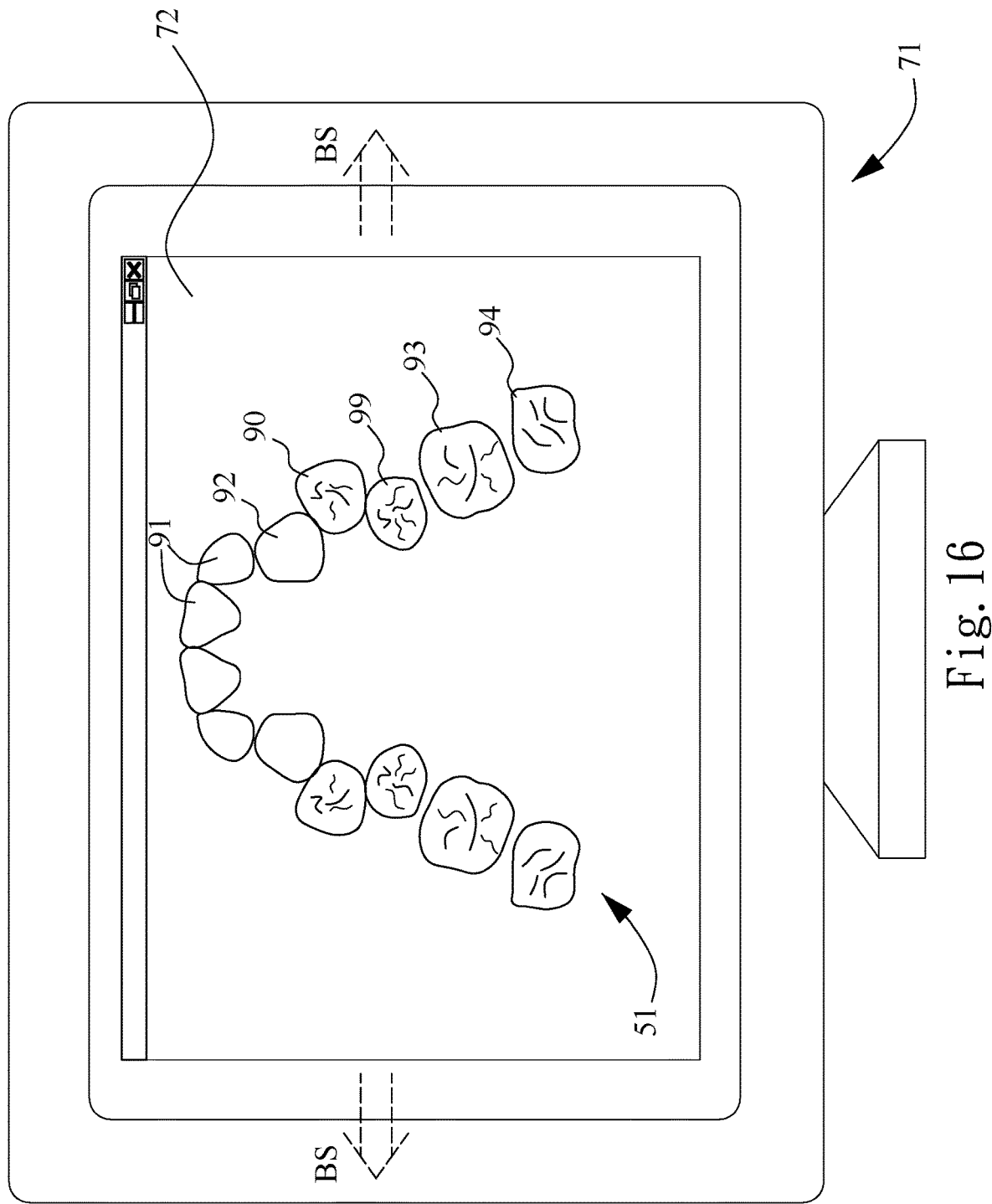
FIG. 16 is schematic diagram showing the digital representation of the initial dental arch displayed in the dental software.
Figure 17:
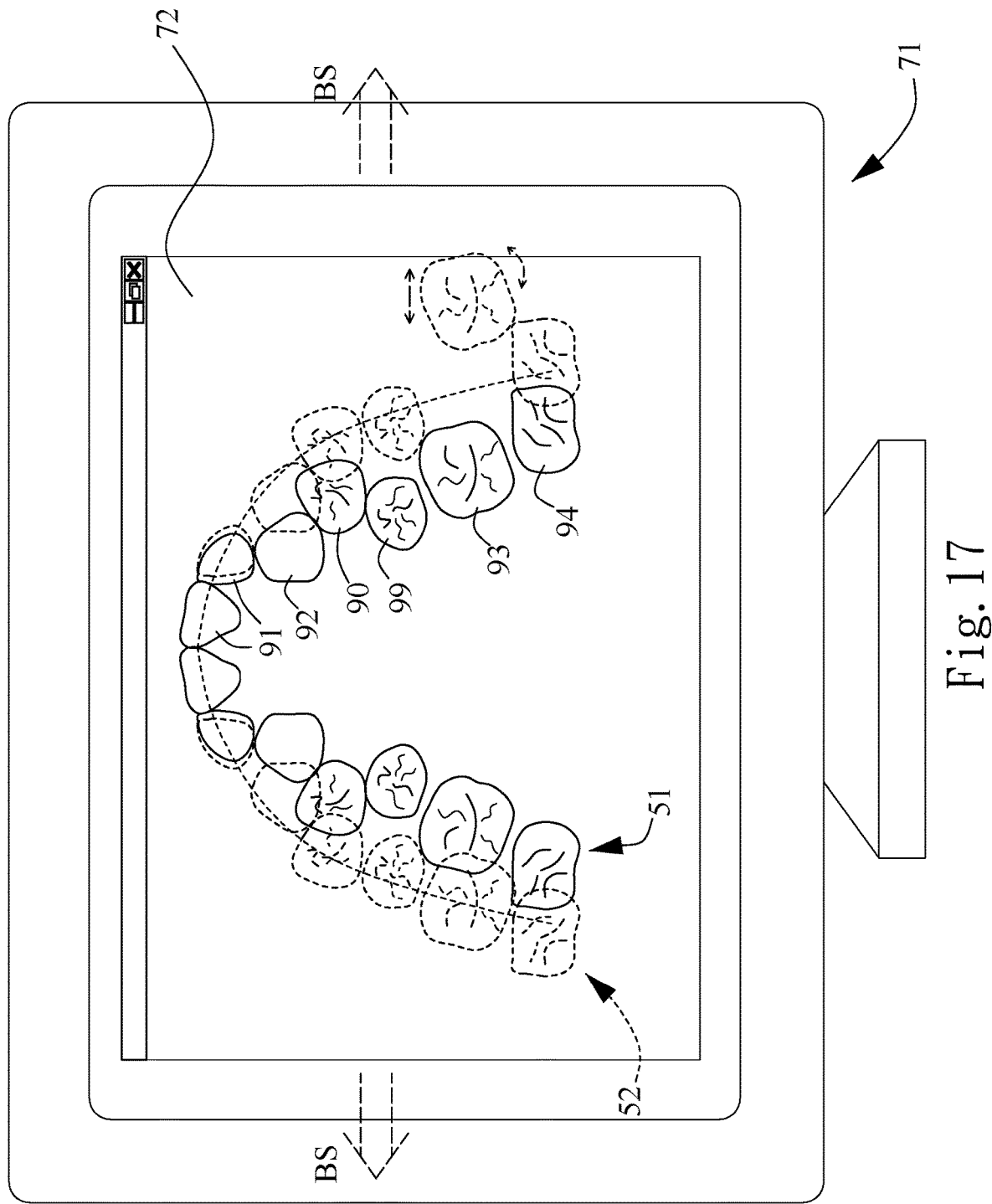
FIG. 17 is schematic diagram showing that tooth of the digital representation of the initial dental arch is moved or rotated.
Figure 18:
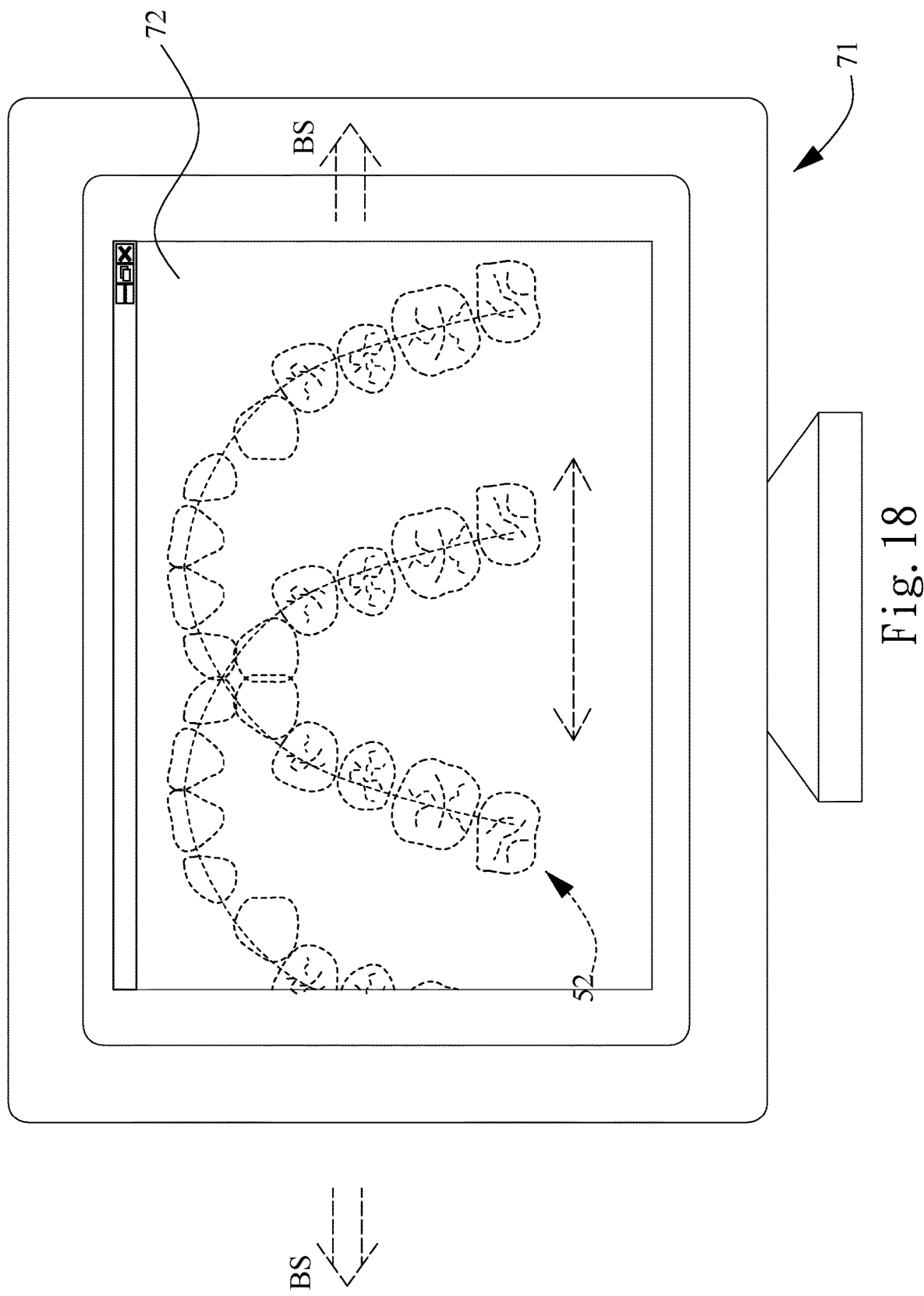
FIG. 18 is schematic diagram showing that the contour of the digital intermediate dental arch is moved along x-axis or y-axis.
Figure 19:
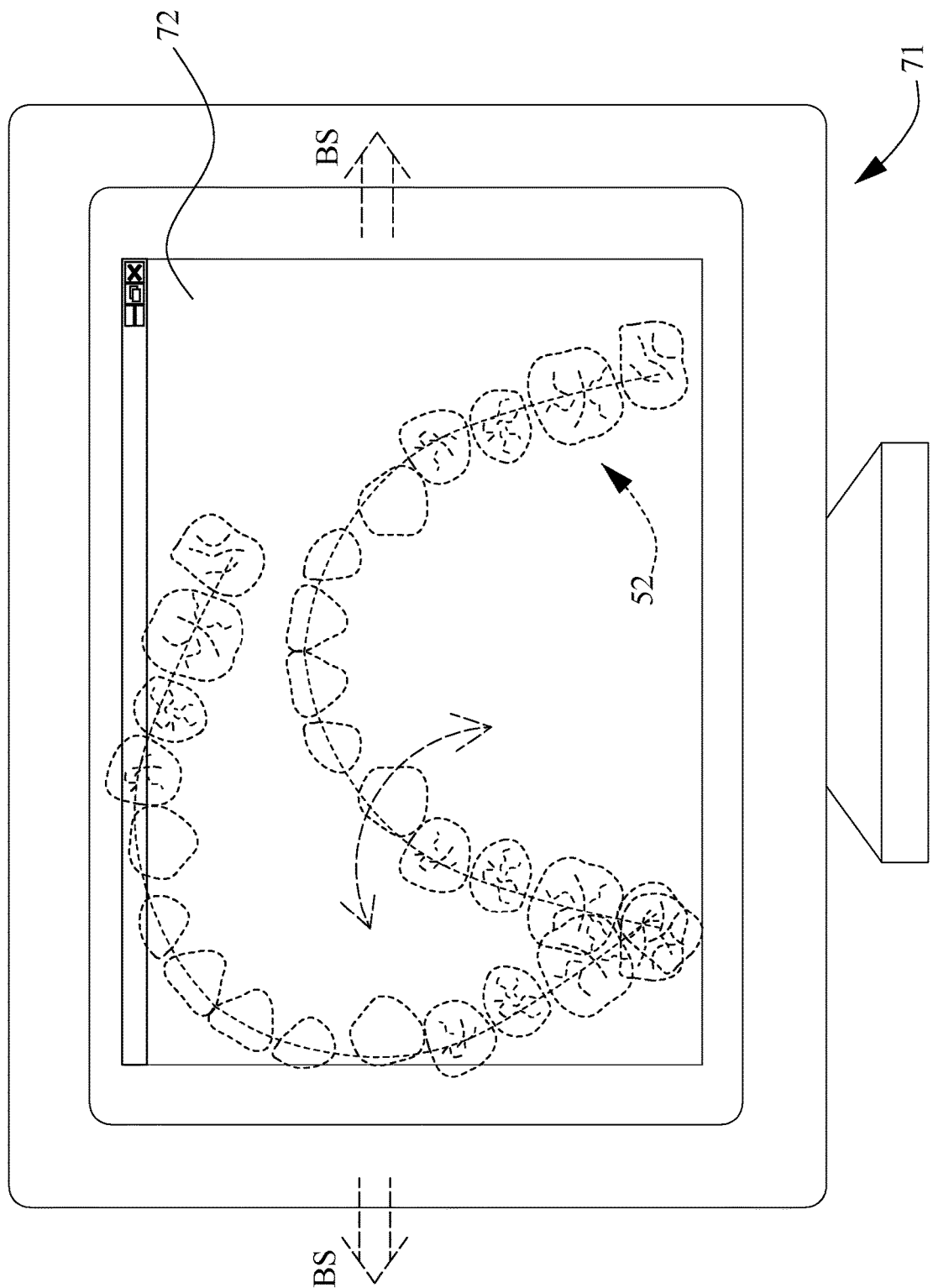
FIG. 19 is schematic diagram showing that the contour of the digital intermediate dental arch is rotated.
Figure 20:
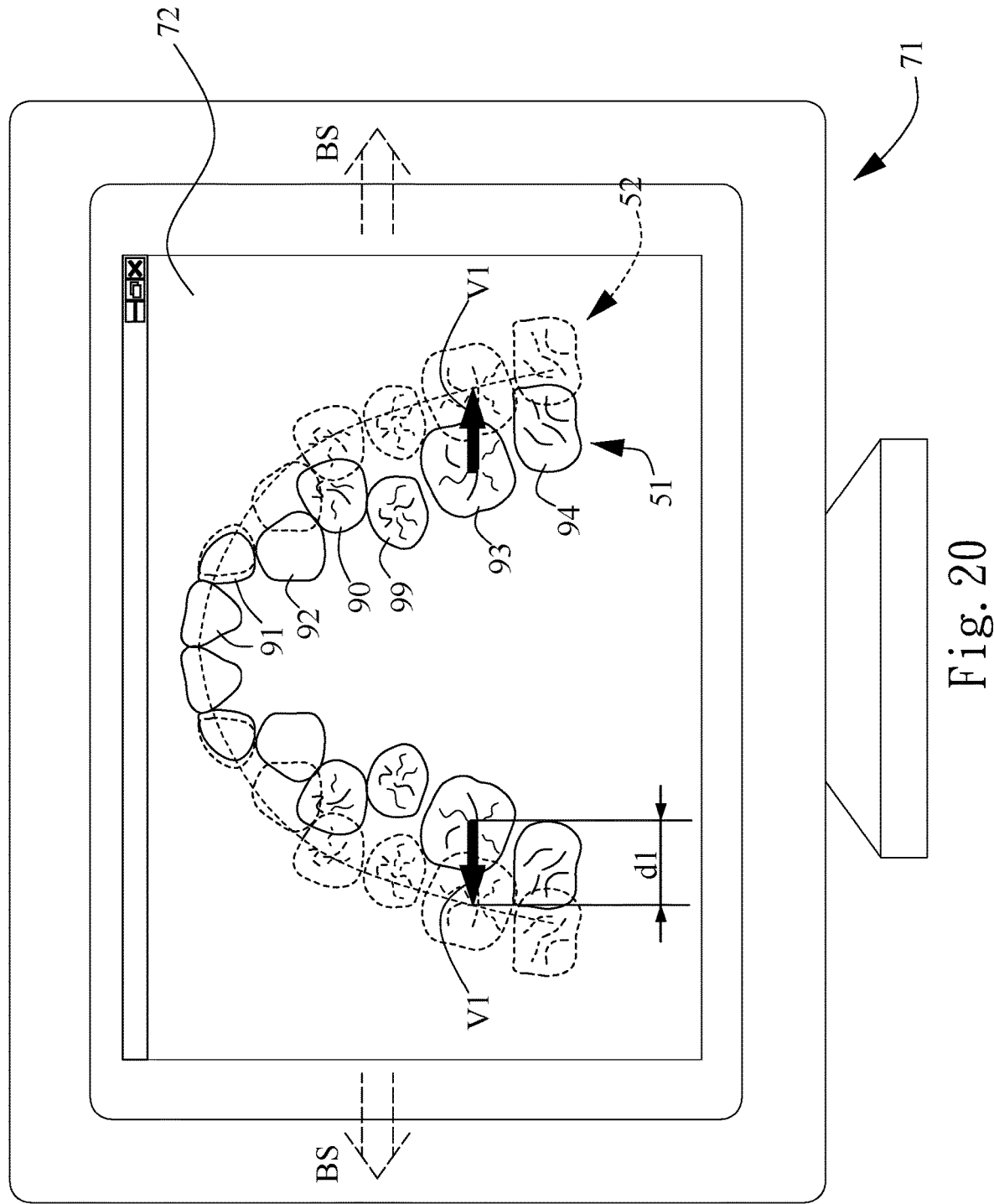
FIG. 20 is schematic diagram showing that the digital initial dental arch and the digital intermediate dental arch are superimposed, and afterward the expansion vector V1 is set.

Then as shown in FIG. 16, an expansion vector V1 is set for the first molar 93 of the digital representation of the initial dental arch 51 (step G3). The expansion vector V1 determines the direction and magnitude of the expansion applied to the first molar 93 of the initial dental arch 51. In step G3, setting the expansion vector V1 for the first molar 93 serves as the foundation for subsequent tooth movements for the first molar 93. The expansion vector V1 establishes the desired direction for expanding the first molar 93 and provides a reference point for aligning the remaining teeth. The step G3 can further have sub-steps G31~G33 involved. As shown in FIG. 17, the teeth of the digital representation of the initial dental arch 51 are moved or rotated, to align the fossae or cusps of all teeth in a curved digital intermediate dental arch 52 (step G31). Preferably, the rotation of the tooth in Step G31 is less than 30 degrees, to ensure that the tooth rotation remains within a clinically acceptable range. When movement or rotation of teeth of the initial dental arch 51 are made, the upper teeth are realigned based on the fossa (interior hollow) of the respective upper tooth, while the lower teeth are realigned based on the cusp (pointed edge) of the respective lower tooth. After the step G31 is made, the teeth of the initial dental arch 51 are adjusted to align the fossae or cusps in a curved digital intermediate dental arch 52. Note that the digital intermediate dental arch 52 is not the final state for orthodontic treatment, but only a temporary outcome of step G31. As shown in FIG. 18 and FIG. 19, the contour of the digital intermediate dental arch 52 is manually produced, so that it can be moved along x-axis or y-axis as demonstrated in FIG. 18, or rotated as demonstrated in FIG. 19 through dental software 72. Afterward, two first molars 93 of the digital intermediate dental arch 52 are superimposed onto the buccal side BS of the two first molars 93 of the digital representation of the initial dental arch 51 (step G32) as shown in FIG. 20. Preferably the alignment of four first molars 93 in Step G32 are achieved by aligning the mesial buccal cusps of the four first molars 93 in a straight line. Besides, the superimposing position of four first molars 93 are evenly distributed on left quadrant and right quadrant. Noted that buccal side BS is consistent with the x-axis direction within dental software 72, since it will be more convenient and assessable to arrange the right quadrant and left quadrant of dental arch at the same level of the dental software 72.

Figure 21:
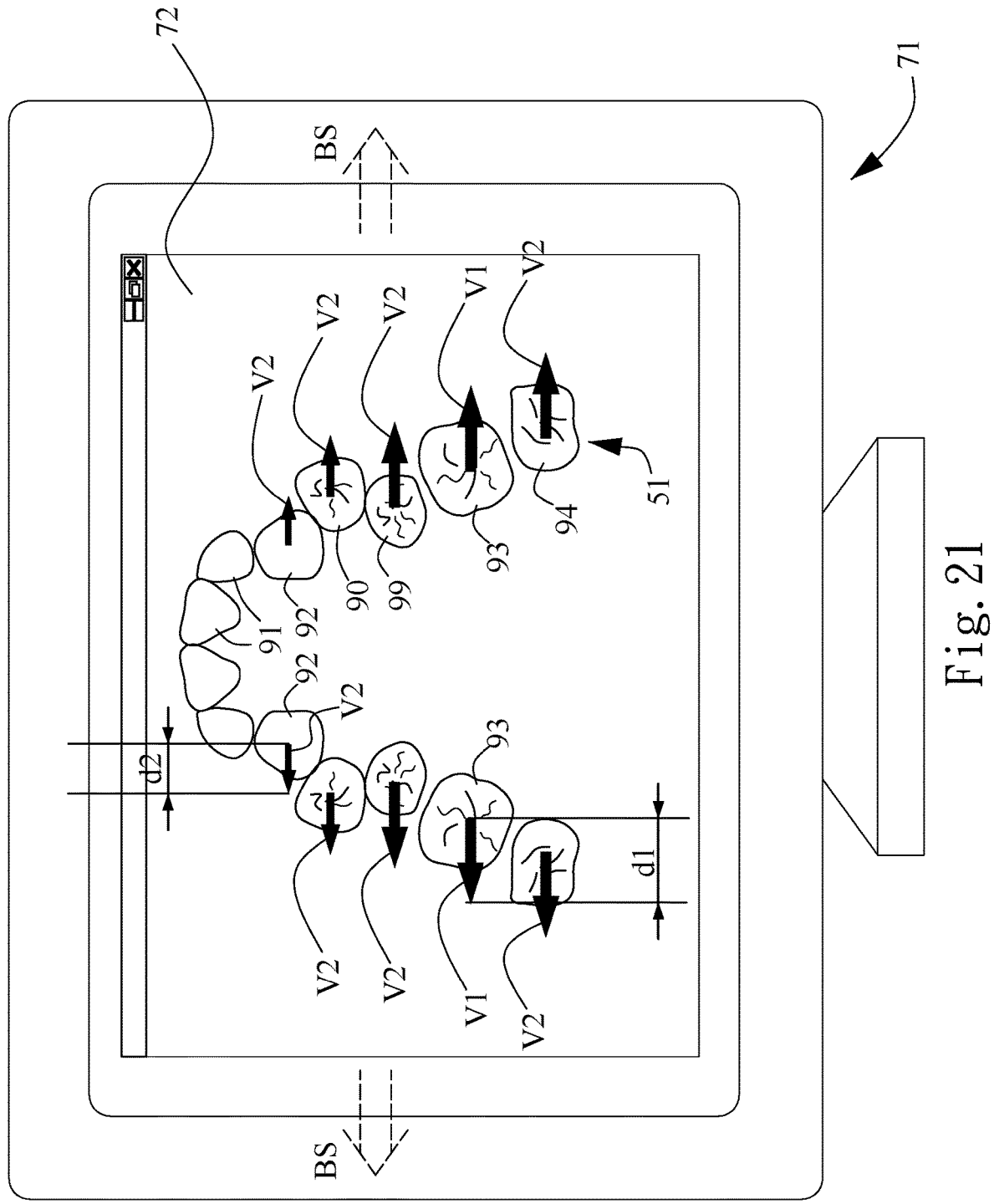
FIG. 21 is schematic diagram showing that the expansion vectors V2 are set.

Further as shown in FIG. 20, an expansion vector V1 can be set from the first molar 93 of the digital representation of the initial dental arch 51 towards the first molar 93 of the digital intermediate dental arch 52 (step G33). This expansion vector V1 defines the direction and magnitude of the expansion applied to the first molar 93 of the digital intermediate dental arch 52, ensuring a controlled and coordinated movement of the first molar 93. After the expansion vector V1 is set, an expansion vectors V2 are subsequently set for the remaining teeth of the digital representation of the initial dental arch 51, based on the expansion vector V1 (step G4). The expansion vectors V2 determine the expansion direction and magnitude for each remaining teeth, including the second molar 94, second premolar 99, first premolar 90, canine 92 and incisors 91. To be clear and specific, the step G4 can further have sub-steps G41~G42 involved. As shown in FIG. 21, the expansion distances d2 are set for the remaining teeth (i.e. excluding the first molar 93 of the digital representation of the initial dental arch 51 based on the expansion distance d1 of the expansion vector V1 (step G41), and then an individual expansion vectors V2 are set for each teeth starting from the remaining teeth of the digital representation of the initial dental arch 51, with the expansion vector V1 as the direction and the expansion distance d2 as the value for each remaining teeth (step G42). According to the clinic experiments, the value of the expansion distance d2 can be determined by mathematical formula $d2=d1*0.8^n$, where n=0 for the second molar, n=1 for the second premolar, n=2 for the first premolar, n=3 for the canine, and n=∞ for the incisor. In this manner, the magnitude of the expansion distances d2 for the remaining teeth of the digital representation of the initial dental arch 51 are determined based on the expansion distance d1 of the expansion vector V1. This ensures a consistent and proportional expansion throughout the digital initial dental arch 51. Additionally, individual expansion vectors V2 are set for each teeth, starting from the remaining teeth of the digital representation of the initial dental arch 51. These vectors, guided by the direction of V1, determine the specific expansion distance d2 for each teeth, allowing for precise tooth movements. The value of the expansion distance d2 is determined by the mathematical formula $d2=d1*0.8^n$, where n stands for the tooth type. The expansion distances d2 are gradually reduced from the first molar 93 to the second premolar 99, first premolar 90, canine 92, and incisors 91, ensuring a controlled and gradual expansion of the dental arch. Clinically, the expansion distance d1 and the expansion distance d2 are preferably between 1 to 3 mm, since too much displacement will bring greater pain to the patient during orthodontic treatment. Below shows the mathematic relationship between the expansion distance d1 and d2:

dontist to customize the treatment plan based on the patient's specific needs and desired outcome. After the contour of the digital representation of the target output dental arch 53 is determined, a physical orthodontic appliance 10 can be outputted based on the profile of the digital representation of the target output dental arch 53 (step G7). Preferably the output of the target output dental arch 53 can be made through 3D printing. Noted that the orthodontic appliance 10 is custom-made to fit the patient's teeth and applies the necessary forces to gradually move the teeth into the desired alignment, so it ensures that the teeth are positioned in a natural and harmonious arch shape, promoting proper occlusion and enhancing the aesthetic appearance of patient's dental arch if the orthodontic treatment is made. Therefore, the steps G3-G7 involve setting expansion vectors V1 and V2, forming a target output dental arch 53, and generating a physical orthodontic appliance 10 based on the digital representation. Besides the steps G1 to G7 can be comprised or incorporated into the manufacturing method of multi-stage orthodontic appliances 10 and 20 demonstrated in the FIG. 6A to FIG. 7B, thus every stage of orthodontic treatment can take advantage of the bone expansion to achieve teeth correction and alignment.

These steps G1 to G7 overcome the limitations of conventional methods by introducing controlled expansion to achieve tooth alignment. The expansion vectors V1 and V2 determine the direction and magnitude of the tooth movements, ensuring coordinated and efficient realignment of the entire dental arch. The method for fabricating the orthodontic appliance 10 through teeth expansion of archway in dental software 72 addresses the technical deficiencies in traditional orthodontic treatments by leveraging digital technology and precise expansion techniques. Conventional methods often rely on manual adjustments and imprecise measurements, leading to suboptimal results and prolonged treatment duration. In contrast, the present method utilizes digital representations and software tools to accurately analyze the initial dental arch 51 and plan the desired tooth movements. The described method for orthodontic tooth alignment through expansion archway offers several tech-

|  | Incisor<br>n = ∞ | Canine<br>n = 3 | 1st premolar<br>n = 2 | 2nd premolar<br>n = 1 | 1st molar<br>reference value | 2nd molar<br>n = 0 |
|---|---|---|---|---|---|---|
| Math formula | $d2 = d1 * 0.8^\infty$ | $d2 = d1 * 0.8^3$ | $d2 = d1 * 0.8^2$ | $d2 = d1 * 0.8^1$ | d1 | $d2 = d1 * 0.8^0$ |
| d2 value | d2 = 0 | d2 = 0.512 * d1 | d2 = 0.64 * d1 | d2 = 0.8 * d1 | d2 = d1 | d2 = d1 |

Figure 22:
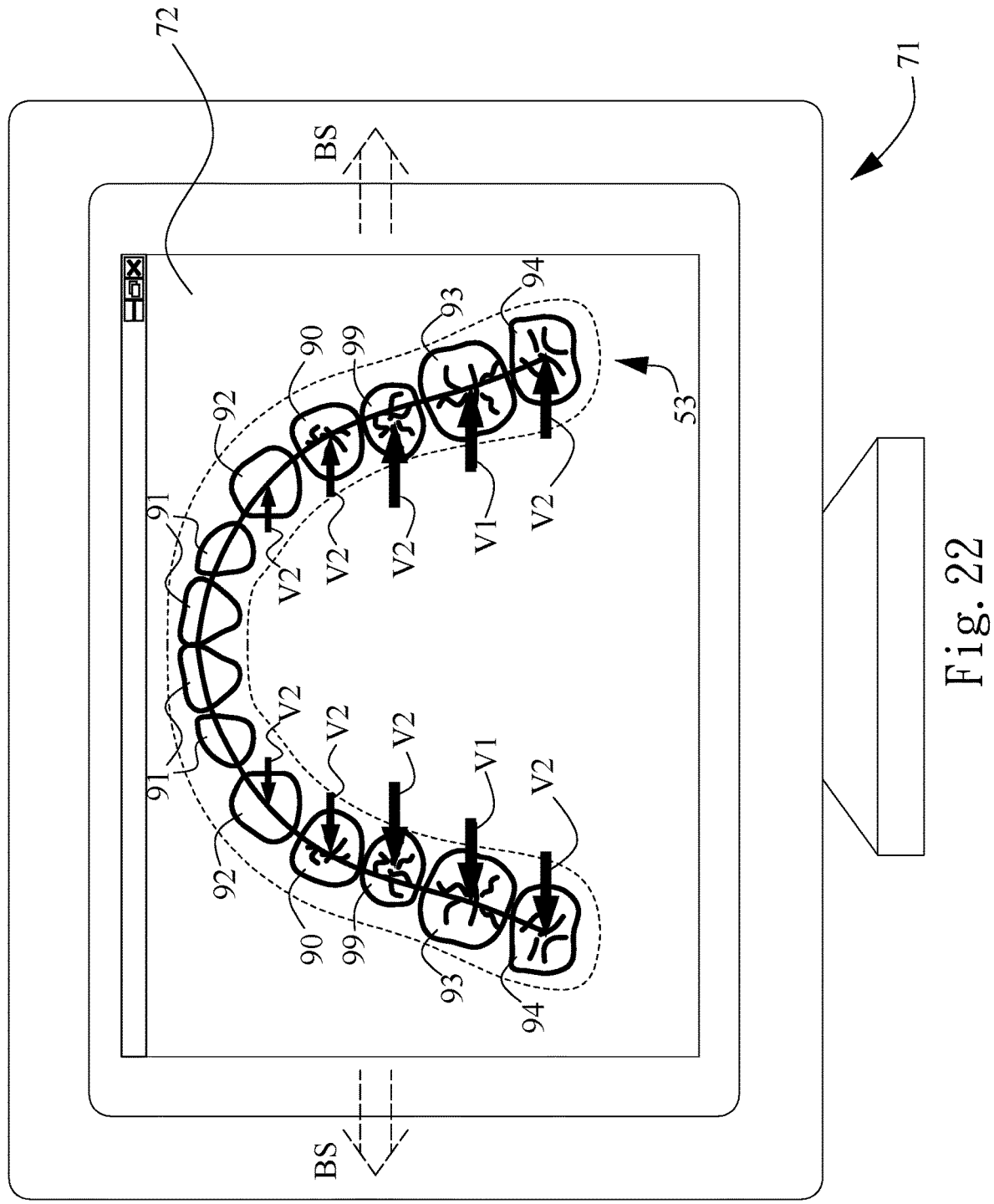
FIG. 22 is schematic diagram showing that the digital representation of a target output dental arch is formed based on the expansion vectors V1 and V2.

After the expansion V1 derived from the first molar 93 and the expansions V2 derived from the remaining teeth are made, a digital representation of a target output dental arch 53 can be formed as shown in FIG. 22, to comprise multiple teeth at the ends of the expansion vectors V1 and V2 (step G5). A digital representation of a target output dental arch 53 is formed by extending the expansion vectors V1 and V2 to create multiple teeth at their respective endpoints. This digital representation stands for the desired alignment and serves as a guide for the subsequent treatment steps, utilizing for correcting patient's teeth. Then, the teeth positions of the digital representation of the target output dental arch 53 can be optionally adjusted according to medical practice experience or subsequent manufacturing considerations (step G6). This adjustment allows for fine-tuning and optimization of the teeth alignment, ensuring the best possible outcome for the patient. This flexibility enables the orthonical advantages. By leveraging digital technology and precise expansion techniques, the method provides a more accurate and efficient approach to tooth alignment. The use of digital representations in dental software 72 enables comprehensive analysis, precise planning, and customized treatment. The controlled expansion vectors V1 and V2 ensure coordinated and controlled tooth movements, resulting in improved occlusion, enhanced aesthetics, and reduced treatment duration. In the viewpoint of orthodontic therapy itself, the fabricating method by means of bone expansion will bring benefits on 2 phases treatments: phase 1, functional orthotropic therapy, and phase 2, customized silicone tooth positioners. In phase 1, it aims to correct the bone deformity and address the underlying skeletal issues. Functional orthotropic therapy involves the use of orthotropic appliances, which help guide the growth and development of the facial bones, particularly the maxilla and mandible. This therapy aims to improve the patient's facial profile, correct maxillary hypoplasia, and reduce the severity of maxillary protrusion. Additionally, it helps to widen the upper arch and create space to alleviate tooth crowding. In phase 2, after resolving the bone space problem and improving the underlying skeletal structure, the second phase of the treatment focused on guiding the erupting permanent teeth into proper alignment and achieving Class I occlusion. Customized silicone tooth positioners were used for this purpose. These positioners are designed to fit the patient's teeth precisely and apply gentle, consistent pressure to move the teeth into the desired positions. This phase of treatment considered both aesthetics and occlusal function, ensuring that the teeth were not only aligned properly but also functioned well together during biting and chewing.

In summary, the method of orthodontic suite can fabricate a multi-stage orthodontic appliance 10, 20, to pre-determine a shifting or rotating position for patient's malocclusive, malposition or abnormal aligned teeth and jaws, and even reshape and regenerate jawbone through biological morphology of orthodontics, and further address the hypoplasia or overdevelopment of dental arch. Besides, the first tongue support 12 or second tongue support 22 can raise the position of the tongue 98 and relax the throat muscles, and then open the respiratory tract to avoid airway obstruction. Furthermore, the multi-stage orthodontic appliances 10 and 20 can train the patient's breathing and reduce or eliminate symptoms of mouth breathing caused by snoring and a lowered tongue position, improving sleep quality and reducing the frequency and noise of snoring. Unlike traditional metal archwires, the orthodontic suite reduces issues with positioning, movement, and orientation control and increases accuracy in correcting azimuth and movement. Therefore, orthodontic treatments such as teeth alignment, jaw correction, teeth reshaping, repositioning, and occlusion arrangement, etc., can be performed through the present invention, and the patient can continue to brush and clean their teeth with ease and convenience while utilizing the orthodontic suite. So the orthodontic suite of present invention is adaptable to all ages including adults and children, making it highly practical for clinical use and commercially advantageous.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What the claims are:

1. A method for fabricating orthodontic appliance using bone expansion for dental alignment, comprising the steps of:
    Step G1: obtaining a digital representation of an initial dental arch (51) of a dental patient;
    Step G2: displaying the digital representation of the initial dental arch (51) and each tooth using a dental software (72);
    Step G3: setting an expansion vector (V1) for the first molar (93) of the digital representation of the initial dental arch (51);
    Step G4: setting expansion vectors (V2) for the remaining teeth of the digital representation of the initial dental arch (51), based on the expansion vector (V1);
    Step G5: forming a digital representation of a target output dental arch (53) comprising multiple teeth at the ends of the expansion vectors (V1) and (V2);
    Step G6: optionally adjusting the teeth positions of the digital representation of the target output dental arch (53);
    Step G7: outputting a physical orthodontic appliance (10) based on profile of the digital representation of the target output dental arch (53).

2. The method for fabricating orthodontic appliance using bone expansion for dental alignment according to claim 1, wherein the Step G3 has the following sub-steps:
    Step G31: moving or rotating the teeth of the digital representation of the initial dental arch (51) to align the fossae or cusps of all teeth in a curved digital intermediate dental arch (52);
    Step G32: superimposing the two first molars (93) of the digital intermediate dental arch (52) onto the buccal side (BS) of the two first molars (93) of the digital representation of the initial dental arch (51);
    Step G33: setting an expansion vector (V1) from the first molar (93) of the digital representation of the initial dental arch (51) towards the first molar (93) of the digital intermediate dental arch (52).

3. The method for fabricating orthodontic appliance using bone expansion for dental alignment according to claim 2, wherein the superimposing position of four first molars (93) are evenly distributed on left quadrant and right quadrant.

4. The method for fabricating orthodontic appliance using bone expansion for dental alignment according to claim 2, wherein the alignment of four first molars (93) in Step G32 are achieved by aligning the mesial buccal cusps of the four first molars (93) in a straight line.

5. The method for fabricating orthodontic appliance using bone expansion for dental alignment according to claim 2, wherein the rotation of the tooth in Step G31 is less than 30 degree.

6. The method for fabricating orthodontic appliance using bone expansion for dental alignment according to claim 1, wherein the Step G4 has the following sub-steps:
    G41: Setting the expansion distance (d2) for the remaining teeth of the digital representation of the initial dental arch (51) based on the expansion distance (d1) of the expansion vector (V1);
    G42: Setting individual expansion vectors (V2) for each teeth starting from the remaining teeth of the digital representation of the initial dental arch (51), with the expansion vector (V1) as the direction and the expansion distances (d2) as the value for the remaining teeth.

7. The method for fabricating orthodontic appliance using bone expansion for dental alignment according to claim 6, wherein the value of the expansion distance (d2) is determined by mathematical formula $d2=d1*0.8^n$, where n=0 for the second molar, n=1 for the second premolar, n=2 for the first premolar, n=3 for the canine, and n=∞ for the incisor.

8. The method for fabricating orthodontic appliance using bone expansion for dental alignment according to claim 6, wherein the expansion distance (d1) or the expansion distance (d2) are between 1 to 3 mm.

* * * * *